(12) United States Patent
Islam et al.

(10) Patent No.: US 9,357,451 B2
(45) Date of Patent: May 31, 2016

(54) MEASUREMENTS IN A COMMUNICATION NETWORK

(71) Applicant: BLACKBERRY LIMITED, Waterloo (CA)

(72) Inventors: Muhammad Khaledul Islam, Kanata (CA); Andrew Farnsworth, Birmingham (GB)

(73) Assignee: BlackBerry Limited, Waterloo, Ontario (CA)

( * ) Notice: Subject to any disclaimer, the term of this patent is extended or adjusted under 35 U.S.C. 154(b) by 589 days.

(21) Appl. No.: 13/707,750

(22) Filed: Dec. 7, 2012

(65) Prior Publication Data
US 2014/0162650 A1    Jun. 12, 2014

(51) Int. Cl.
*H04W 36/30* (2009.01)
*H04W 36/00* (2009.01)

(52) U.S. Cl.
CPC ...... *H04W 36/0083* (2013.01); *H04W 36/0055* (2013.01)

(58) Field of Classification Search
CPC . H04W 24/10; H04W 36/0083; H04W 64/00; H04W 48/20; H04W 84/045; H04W 36/30; H04W 36/0094; H04W 36/08; H04W 4/02; H04W 76/046; H04W 36/0061; H04W 36/0088; H04W 48/16; H04W 8/02; H04W 24/02; H04W 24/08; H04W 36/0005; H04N 19/124; H04N 19/46; H04N 19/0009; H04N 19/126; H04N 19/14; H04N 19/152; H04N 19/176; H04N 19/186; H04N 19/30; H04N 19/70; H04N 19/00884; H04N 19/103; H04N 19/117; H04N 19/12; H04N 19/134; H04N 19/146; H04N 19/15
USPC .................................. 455/525, 522, 436, 437
See application file for complete search history.

(56) References Cited

U.S. PATENT DOCUMENTS

| 2007/0004445 | A1  | 1/2007 | Dorsey et al. | |
| 2011/0111759 | A1* | 5/2011 | Chami | 455/436 |
| 2012/0236717 | A1* | 9/2012 | Saska et al. | 370/235 |

FOREIGN PATENT DOCUMENTS

WO    2012/008957 A1    1/2012

OTHER PUBLICATIONS

Nokia Siemens Networks et al., "E-UTRA Measurements and Cell Reselection Considerations," 3rd Generation Partnership Project (3GPP); 3GPP TSG-RAN WG2 Meeting #58bis; Jun. 22, 2007; 6 pages.
3rd Generation Partnership Project; Technical Specification Group Radio Access Network; Evolved Universal Terrestrial Radio Access (E-UTRA); User Equipment (UE) procedures in idle mode (Release 9); 3GPP TS 36.304 V9.4.0; Oct. 11, 2010; 32 pages.
Extended European Search Report from related European Patent Application No. 12196158.5 dated May 16, 2013; 7 pages.

* cited by examiner

*Primary Examiner* — Olumide T Ajibade Akonai
*Assistant Examiner* — Natasha Cosme
(74) *Attorney, Agent, or Firm* — Jon Gibbons; Fleit Gibbons Gutman Bongini & Bianco P.L.

(57) ABSTRACT

Methods, device and apparatus for use in a cellular network are disclosed. An example method disclosed herein comprises: receiving, via the cellular network, a bias parameter of a neighbor cell; and determining based on the bias parameter whether or not to perform at least one mobility measurement.

24 Claims, 10 Drawing Sheets

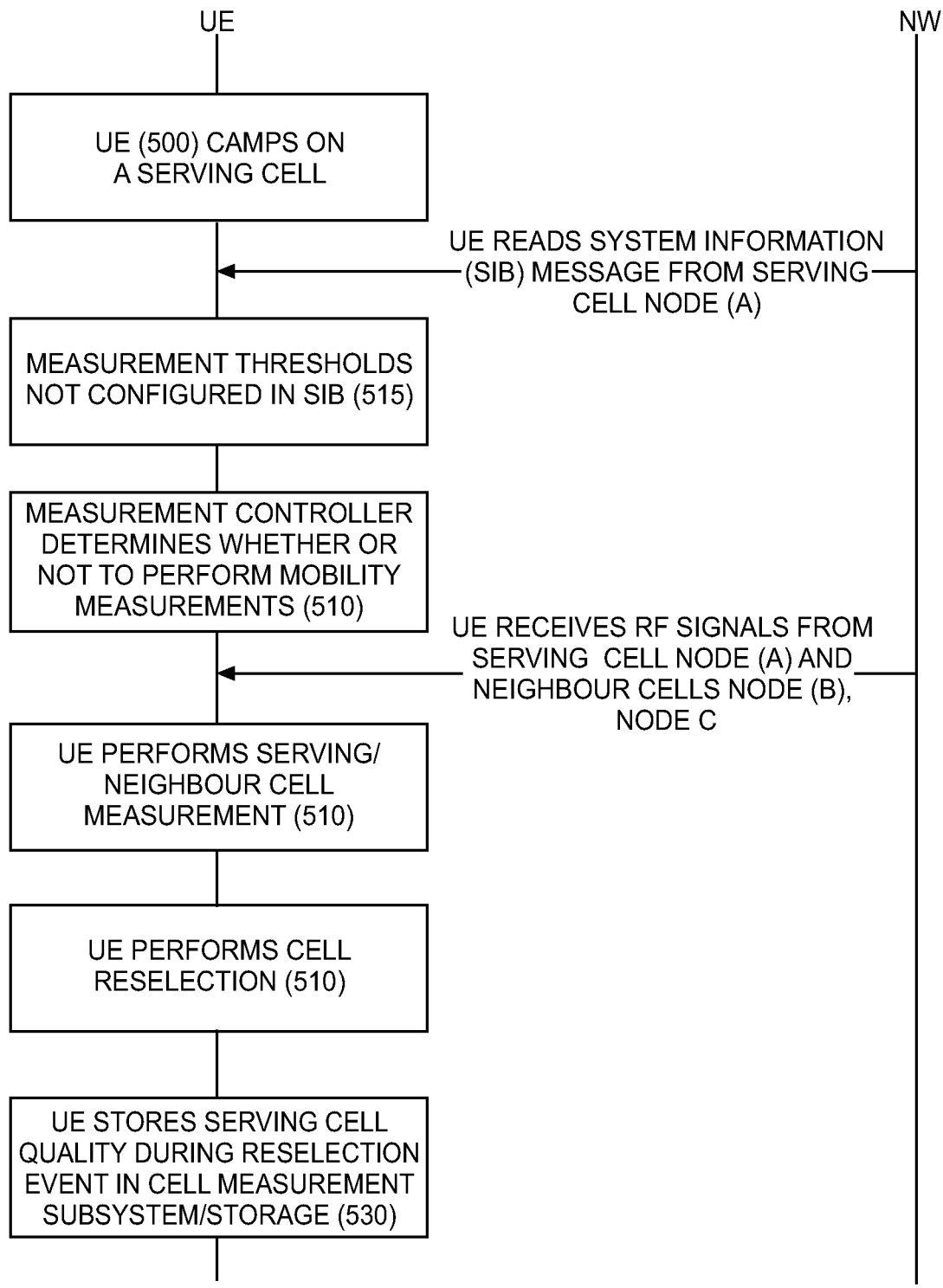

MEASUREMENTS IN A COMMUNICATION NETWORK

FIELD OF THE DISCLOSURE

This disclosure relates generally to communication networks, such as cellular networks, and, more particularly, to determining whether to perform measurements for the purpose of cell reselection.

BACKGROUND

In wireless networks, after a device operating on a particular network (known as a mobile device or user equipment (UE)) has selected a public land mobile network (PLMN) for mobile communication service, the device periodically monitors the performance of its current serving cell when in idle mode of operation (e.g. when there is no active radio connection with a mobile network). The device in idle mode also regularly verifies if there is a neighbour cell that can provide better service quality while maintaining service continuity for the device. When a better cell is identified, a cell re-selection procedure is typically launched to allow the device to camp on the better suitable cell from its current serving cell.

In wireless networks compliant with Third Generation Partnership Project (3GPP) specifications, a cell re-selection procedure is determined by parameters in system information block (SIB) messages broadcasted by the radio access network (RAN) within each cell. A device performs neighbour cell measurements using one or more of the criteria set in the SIB message. The device launches neighbour cell measurements when one or more certain parameters of the serving cell are below or equal to a predetermined threshold set in the SIB message.

In some existing communication networks, the settings of the idle mode mobility measurement parameter thresholds in the SIB messages are mostly static parameters on a per cell basis, not adapted for optimal cell performance. As a result, the measurement threshold settings in the SIB message may lead to excessive current consumption in a device and significantly shorten the device standby battery life if the threshold is set too high. The consequence of the threshold being set too low could be a decreased average serving cell quality, delayed re-selection to a neighbour cell, and an increased likelihood of the device being unreachable for paging (e.g. device going out of service). In some other existing communication networks, the measurement parameters are unspecified or threshold values not configured, which requires the device to perform mobility measurements all the time during idle mode.

Additionally, a measurement threshold in existing mobile networks is usually manually set by a network operator on a per cell basis. The network operators need to perform time-consuming and costly field tests to adjust and optimize the network measurement parameters. As mobile communication technology evolves, the provision of self-optimizing networks (SON) is becoming a high priority for network operators to derive the optimal performance from the network in an automated and cost-effective manner.

References made herein to "user equipment (UE)", "communication device" and "mobile device", "mobile station (MS)", "portable device", "user terminal", "terminal equipment" and the like are references to devices operating in conjunction with existing communication networks, e.g. mobile or cellular networks.

BRIEF DESCRIPTION OF THE DRAWINGS

FIG. 5 is a message sequence chart representative of steps that may be performed to implement the example UE mobility measurements;

DETAILED DESCRIPTION

Figure 1:
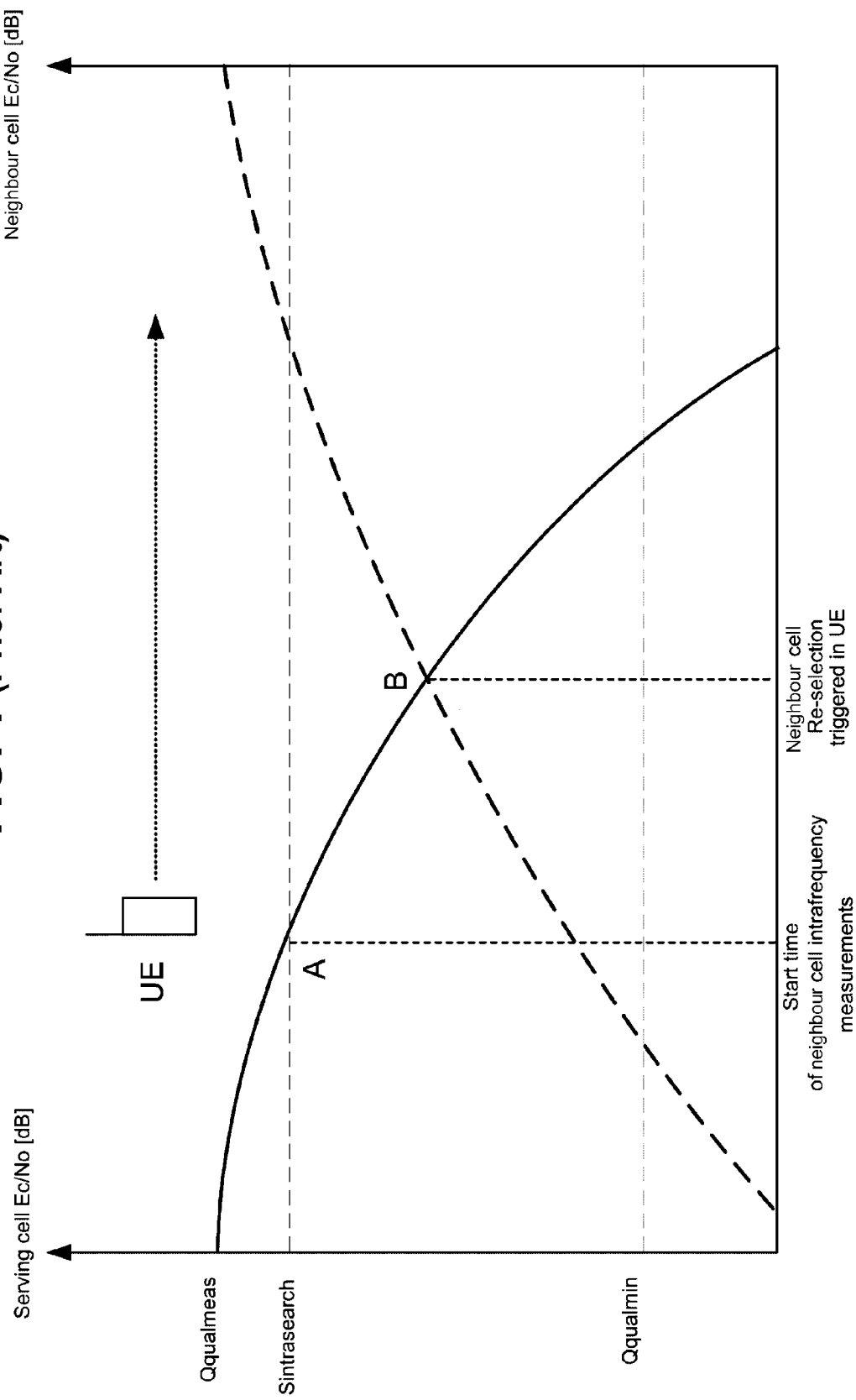
FIG. 1 illustrates an existing UE idle mode neighbour cell measurement and the corresponding measurement parameters.

Methods, devices and apparatus for performing mobility measurements or determining whether to perform such measurements, e.g. idle mode mobility measurements, in a communication network, such as a mobile or cellular network are disclosed herein. In an example method disclosed herein, an example user equipment (UE) or mobile device camps on a cell of the communication network after the UE has selected said communication network, and a determination is made as to whether to perform mobility measurements. The communication network may be a public land mobile network (PLMN), for mobile communication service. An example communication network may be an existing or future mobile network that is compliant with the Third Generation (3G) or Third Generation Partnership Project (3GPP) specifications. Generally, according to certain implementations of such networks, the UE performs a measurement after having camped on the cell (referred to as serving cell) for a short period. In one example, in system information block (SIB) messages, received by the UE from the mobile network, the mobile network does not configure measurement parameter thresholds for UE mobility measurements. In the above or other scenarios, the UE determines whether to perform mobility measurements through executing one or more internal processes (e.g., machine readable instructions embedded) in the UE using parameters received from the mobile network and/or parameters determined or measured by the UE.

In a first aspect, there is a method in a mobile device for use in a cellular network which may comprise: receiving, via the cellular network, a bias parameter of a neighbour cell; determining based on the bias parameter whether or not to perform at least one mobility measurement. The method may further comprise performing the mobility measurement if the determination to perform said at least one measurement is positive. The step of performing the mobility measurement may comprise performing the mobility measurement in respect of said neighbour cell for which said bias parameter has been received.

The mobile device may be connected, camped or parked on a current serving cell, e.g. the cell within which the mobile device is currently set to communicate, and the neighbour cell is an adjacent cell to the serving cell, or any cell which can be detected by the mobile device other than the current serving cell. The mobility measurement may be performed in a connected mode, or idle mode, but may generally be performed in a standby mode. Hence, the mobility measurement may be a mobility measurement, or more particularly an idle mode mobility measurement. Standby mode may be defined as a mode defined by the current state of the mobile device including idle mode or connected mode states, e.g. the mobile device is in an idle mode in which it is connected to a network, or parked on current serving cell, but is not actively transmitting and receiving data such as for voice or data communication, or the mobile device is in a connected mode state which is not an active mode, such as URA_PCH, CELL_PCH, or CELL_FACH (see below), and performs neighbour cell measurement and cell re-selection, for example, to maintain or increase its level of connectivity with the network.

In one example, the method may comprise: receiving a bias parameter corresponding to each neighbour cell of a plurality of neighbour cells; determining for each said bias parameter whether or not to perform at least one mobility measurement in respect of each corresponding neighbour cell; and if the determination in respect of a corresponding neighbour cell is positive, performing said at least one mobility measurement in respect of said corresponding neighbour cell.

The method may further comprise allocating a bias parameter with a predefined value for at least one neighbour cell for which no bias parameter has been received. This parameter may be stored in the mobile device. The predefined value may be zero.

The bias parameter may be indicative of a bias allocated by the network to select the neighbour cell in a cell reselection procedure. For example, the bias parameter may be the network or cell parameter, Qoffset, or QoffsetXs,n, wherein X is an integer.

The step of determining may comprise comparing the bias parameter to a threshold value. For example, the step of comparing may comprise determining whether the bias parameter is less than the threshold value. The step of comparing may include a comparison involving a hysteresis parameter. The hysteresis parameter may be Qhyst, or QhystXs, wherein X is an integer.

Qhyst is an example of the hysteresis parameter, and Qoffset is an example of the bias parameter. They are network configuration parameters amongst others as defined in 3GPP Technical Specification 3GPP TS 25.304, section 5.2.6.1.1 which is incorporated herein by reference in its entirety. The aforementioned network parameters may be transmitted in a message received by the mobile device from the mobile network. One or more of these said network configuration parameters may be utilised in determining whether to perform one or more mobility measurements.

More particularly, the aforementioned network parameters can be defined as follows: Qoffset, or QoffsetXs,n: This is a bias parameter of each given neighbour cell indicative of a bias allocated by the network to select the given neighbour cell in a cell reselection procedure; and Qhyst, or QhystXs: This is a hysteresis parameter of the serving cell which is used to prevent ping-pong between cells (e.g. frequent cell reselection) by specifying a value which can be used to permit reselection to a neighbour cell only when its signal strength, quality or power is better by at least the value of the hysteresis parameter.

In the above, Qoffset, or QoffsetXs,n, and Qhyst, or QhystXs, may be specified in decibels (dB) and may take positive, or negative (Qoffset, or QoffsetXs,n only) or zero values. Also in the above, where specified, X is an integer which corresponds to the type of measurement for which the parameter is used. In particular, the value 1 for QhystXs (i.e. Qhyst1s), for example, is used for RSCP (Received Signal Code Power) and the value 2 for QhystXs (i.e. Qhyst2s), for example, is used for Ec/No (Energy per Chip/Noise). Moreover, the value 1 for QoffsetXs,n (i.e. Qoffset1s,n), for example, is set to CPICH RSCP, and the value 2 for QoffsetXs,n (i.e. Qoffset2s,n), for example, is set to CPICH Ec/No.

More specifically, particular examples of the aforementioned network parameters may be:

Qoffset1s,n: This specifies the (bias) offset between two neighbouring cells. It can be used for TDD and GSM cells and for FDD cells, for example, in case the quality measure for cell selection and re-selection is set to CPICH RSCP (see further below).

Qoffset1s,n: This specifies a (bias) offset between two neighbouring cells. It can be used for FDD cells in case the quality measure for cell selection and re-selection is set to CPICH Ec/No.

Qhyst1s: This specifies a hysteresis value (Qhyst). It can used for TDD and GSM cells and for FDD cells in case the quality measure for cell selection and re-selection is set to CPICH RSCP.

Qhyst1s,PCH: This specifies a hysteresis value (Qhyst) to be used in RRC connected mode states CELL_PCH and URA_PCH. It can be used for TDD and GSM cells and for FDD cells in case the quality measure for cell selection and re-selection is set to CPICH RSCP.

Qhyst1s,FACH: This specifies a hysteresis value (Qhyst) which can be used in RRC connected mode state CELL_FACH. It can be used for TDD and GSM cells and for FDD cells in case the quality measure for cell selection and re-selection is set to CPICH RSCP.

Qhyst2s: This specifies a hysteresis value (Qhyst). It can be used for FDD cells if the quality measure for cell selection and reselection is set to CPICH Ec/No.

Qhyst2s,PCH: This specifies a hysteresis value (Qhyst) to be used in RRC connected mode states CELL_PCH and URA_PCH. It is used for FDD cells if the quality measure for cell selection and re-selection is set to CPICH Ec/No.

Qhyst2s,FACH: This specifies a hysteresis value (Qhyst) which can be used in RRC connected mode state CELL_FACH. It can be used for FDD cells if the quality measure for cell selection and re-selection is set to CPICH Ec/No.

The step of comparing may comprise determining whether the bias parameter, e.g. Qoffset, (optionally summed with the hysteresis parameter, e.g. Qhyst) is less than, or less than or equal, to a threshold value. The step of comparing may also and in addition comprise determining whether a selection quality parameter, e.g. Squal, is less than, or less than or equal, to a further threshold value. This further threshold value may be different to the threshold value against which the bias parameter is compared. A positive determination to perform a mobility measurement may be made if the bias parameter summed with the hysteresis parameter is less than, or less than or equal, to a threshold value.

The step of determining may comprise determining based on the bias parameter and a selection quality parameter whether or not to perform at least one mobility measurement. This step may further comprise obtaining the selection quality parameter via the cellular network, wherein the selection quality parameter is the selection quality parameter for a serving cell of the mobile device. The step of determining may comprise comparing the bias parameter of the neighbour cell with the selection quality parameter, for example comparing the selection quality parameter to a threshold value. The threshold value may vary in dependence on the bias parameter and the selection quality parameter according to a predefined relationship. Alternatively, the threshold value may be a fixed predefined value.

Of course, it will be appreciated that the step of comparing may comprise determining whether the bias parameter, e.g. Qoffset, (optionally summed with the hysteresis parameter, e.g. Qhyst) is greater than, or greater than or equal, to the threshold value. The step of comparing may also and in addition comprise determining whether a selection quality parameter, e.g. Squal, is greater than, or greater than or equal to the further threshold value. In this scenario, a positive determination not to perform a mobility measurement may be made if the bias parameter summed with the hysteresis parameter is greater than, greater than or equal, to a threshold value.

The threshold value and further threshold value may be fixed, or one or other, or both may vary in dependence on the bias parameter, e.g. Qoffset, and/or the selection quality parameter, e.g. Squal according to a predefined relationship, a plurality of predefined relationships. In one embodiment where the threshold value is fixed, the threshold value may be: 0 dB, −10 dB, −20 dB, −30 dB, −40 dB, or −50 dB.

In further embodiments, the predefined relationship may be defined as one or more or a combination of the following:
(i) No measurements if Squal>Ssearch and Qoffset>0,
Perform measurements otherwise;
(ii) No measurements if Squal>Ssearch and Qoffset>−Qhyst,
Perform measurements otherwise;
(iii) For Qoffset>$K_1$: No measurements if Squal>$K_2$,
For Qoffset<=$K_1$: No measurements if Squal>$K_2$−$K_3$×Qoffset,
Where, for example: $K_1$=0, $K_2$=10 dB and $K_3$=−1, and
Perform measurements otherwise;
(iv) As for (iii) above, but where, for example: $K_1$=−4 dB, $K_2$=6 dB and $K_3$=−1;
(v) For Qoffset>$K_1$: No measurements if Squal>$K_2$,
For Qoffset<=$K_1$: No measurements if Squal>Ssearch−f(Qoffset)+$K_3$,
where f(Qoffset) is a predefined function, e.g. Ceil(Qoffset/n)×n, and Ceil(Qoffset/n) is the lowest integer that is not smaller than Qoffset/n, wherencan be any predefined integer, for examplencan be in the range 1 to 20, 1 to 10, or 1 to 5, or be exactly 1, 2, 3, 4, 5, 6, 7, 8, 9 or 10, and
Perform measurements otherwise;
(vi) For Qoffset>$K_1$: No measurements if Squal>max($K_5$, $K_2$−$K_3$*Qoffset),
For Qoffset<=$K_1$: No measurements if Squal>$K_2$, and
Perform measurements otherwise;
(vii) For Qoffset>$K_1$: No measurements if Squal>$K_2$,
For Qoffset<=$K_1$: No measurements if Squal>$K_4$, and Perform measurements otherwise.

In the above $K_1$, $K_2$, $K_3$, $K_4$ and/or $K_5$ may be any predefined value. More specifically: $K_1$ may equate to or be greater than a fixed value, which may be −Qhyst, or be within a range +/−0%, 1%, 2%, 5%, 10% or 20% of the fixed value. The fixed value may be in a range −20 dB to 0 dB, −10 dB to 0 dB, −6 db to 0 dB, or −5 dB to 0 dB. Alternatively, the fixed value may be −20 dB, −10 dB, −5 dB, −4 dB, −3 dB, −2 dB, −1 dB or 0 dB.

$K_2$ may equate to or be less than a fixed value, which may be Ssearch, or be within a range +/−0%, 1%, 2%, 5%, 10% or 20% of the fixed value. The fixed value may be in a range 0 dB to 20 dB, 0 dB to 10 dB, 0 dB to 6 dB, or 0 dB to 5 dB. Alternatively, the fixed value may be 20 dB, 10 dB, 5 dB, 4 dB, 3 dB, 2 dB, 1 dB or 0 dB.

$K_3$ may equate to or be less than a fixed value, or be within a range +/−0%, 1%, 2%, 5%, 10% or 20% of the fixed value. The fixed value may be in the range 0.1 to 100, 0.5 to 50, 0.7 to 25, 0.8 to 10, 0.9 to 5, 0.95 to 1.5, or 0.99 to 1.1. Alternatively, the fixed value may be 0.5, 1, 2 or 5.

$K_4$ and/or $K_5$ may each equate to or be less than a fixed value which may be within a range +/−0%, 1%, 2%, 5%, 10% or 20% of the fixed value. The fixed value may be in a range −20 dB to 20 dB, −10 dB to 10 dB, −6 dB to 6 dB, or −4 dB to 4 dB. Alternatively, the fixed value may be −20 dB, −10 dB, −5 dB, −4 dB, −3 dB, −2 dB, −1 dB, 0 dB, 1 dB, 2 dB, 3 dB, 4 dB, 5 dB, 10 dB or 20 dB.

The mobile device may communicate with the cellular network via a serving cell and receive the bias parameter of the neighbour cell via the serving cell. The bias parameter may be received in a system information container.

A selection quality parameter of the serving cell may also be received and then a determination is made by the mobile device, based on the bias parameter and the selection quality parameter, whether or not to perform the at least one mobility measurement.

The step of determining may comprise comparing the bias parameter of the neighbour cell with the selection quality parameter, such as Squal. In this scenario, the step of comparing may comprise determining whether the selection quality parameter is less than or equal to a hysteresis parameter added to the bias parameter, which sum is subtracted from a cell search threshold value, for example, a determination as to whether Squal<cell search threshold value−(QoffsetXs+QhystXs,n). The cell search threshold value may equate to Qqualmin+Sthreshold. The cell search threshold value may be in a range comprising 0 dB to 20 dB, for example 10 dB.

A signal quality parameter which may also be measured or obtained by the UE for use in determining whether to perform one or more mobility measurements is the serving cell signal quality parameter, Qqualmeas, i.e. the current measured signal quality (Ec/No) as determined by the UE. Alternatively, a signal power parameter may be measured or obtained by the UE for use in determining whether to perform one or more mobility measurements, and this is Qrxlevmeas which is the serving cell signal power parameter (RSCP).

Performing at least one mobility measurement may comprise obtaining at least one characteristic of a neighbour cell. The at least one characteristic of the neighbour cell is in respect of the neighbour cell corresponding to the received bias parameter.

The mobile device may be in an idle mode and the at least one mobility measurement may be an idle mode mobility measurement. Moreover, the mobile device may not receive one or any Sthreshold search parameters from the cellular network, for example one or any of: Sintrasearch, Sintersearch, Snonintrasearch, SsearchRATm and SinterRATsearch.

Alternatively, the mobile device may receive one or more Sthreshold search parameters from the cellular network, for example at least one of the following Sthreshold parameters such as: Sintrasearch, Sintersearch, Snonintrasearch, SsearchRATm and SinterRATsearch. In this scenario, the method may further comprise determining whether or not to perform a mobility measurement in respect of said neighbour cell for example, if Squal<=Sthreshold, then a neighbour cell or mobility measurement is performed. The Sthreshold value may be 0 dB, 5 dB, 8 dB, 10 dB, or 20 dB.

In a second aspect, a mobile device may comprise: a receiver for receiving at least one cell parameter from a cellular network, including a bias parameter of a neighbour cell; and a processing unit in communication with the receiver and configured to determine based on the bias parameter whether or not to perform at least one mobility measurement.

The processing unit may be configured to perform the mobility measurement if the determination to perform said at least one measurement is positive. The processing unit may be configured to perform the mobility measurement in respect of said neighbour cell for which said bias parameter has been received. The processing unit may be configured to compare the bias parameter to a threshold value.

The processing unit may be configured to determine whether the bias parameter summed with the hysteresis parameter is less than or equal to a threshold value, or greater than or equal to the threshold value. The receiver may receive said at least one cell parameter from a serving cell, and the processing unit may be configured to obtain a serving cell quality parameter of the serving cell and determine based on the bias parameter and the serving cell quality parameter whether or not to perform the at least one mobility measurement. The processing unit may be configured to compare the bias parameter of the neighbour cell with the serving cell quality parameter.

The mobile device may comprise a measurement system that may be configured to determine whether to perform idle mode mobility measurements, for example when certain measurement parameter thresholds are not configured in one or more SIB messages from the network. The measurement system includes a measurement controller, e.g. in the form of a processing unit, that may be configured to determine whether to measure cell quality parameters on a plurality of neighbour cells, and to perform such measurements, a storage that may be configured to save the measured serving cell quality parameters.

In a third aspect, there may be provided a machine readable medium (which may be non-transitory) comprising machine-executable instructions for determining based on a bias parameter of a neighbour cell received from a cellular network whether or not to perform at least one mobility measurement. The machine readable medium may further comprise machine-executable instructions for performing any aspects of the aforementioned method.

The machine-readable medium may comprise coded machine-readable and executable instructions. The execution of the machine-executable instructions is for a mobile device or UE to determine whether to perform idle mode mobility measurements, for example when a SIB message the UE received from a mobile network does not configure certain measurement parameter thresholds for UE idle mode mobility measurements. The machine-executable instructions may also comprise one or more algorithms for measuring cell quality parameters on serving cells at a plurality of prior neighbour cell re-selections, for storing the measured serving cell quality parameters in a local storage.

A mobile communication network typically includes two major parts, a radio access network component (RAN) and a core network component (CN). A radio access network usually resides between wireless user equipments (UE) and the core network to provide to UEs access to voice, data or other communication services provided by the core network. A UE is also variably referred to as a mobile station (MS), a mobile device, a portable device, a user terminal, a terminal equipment and the like. The core network may be further connected to an external data network such as the public internet. An example mobile communication network may be an existing network that is compliant with the Third Generation Partnership Project (3GPP) specifications, such as a 2G Global System for Mobile communications (GSM) network, a 3G Universal Mobile Telecommunications System (UMTS) network, and a 4G Long-Term Evolution (LTE) network.

During normal operation, mobile devices typically form a long-term attachment with the core network by means of establishing a user context within one or more core network nodes. The user context is used by the core network to route inbound and outbound massages between a gateway CN node and a serving CN node to which the UE is attached. As an example, a UE is attached to the core network of a GSM network through a GPRS EDGE radio access network (GE-RAN) (GPRS refers to the general packet radio service, EDGE refers to enhanced data rates for GSM evolution.) In another example, a UE is attached to the core network of an UMTS network through a universal terrestrial radio access network (UTRAN). As a further example, a UE is attached to the evolved packet core (EPC) of an LTE network through an evolved universal terrestrial radio access network (E-UTRAN). When a UE is attached to a mobile network, connectivity of the UE with the RAN and connectivity of the RAN with the CN may be non-continuous in order to save UE battery power and network resources during periods when data activity is low. A Radio Resource Control (RRC) layer (L3) protocol resident within a RAN node (such as the Radio Network Controller—RNC—for UMTS, or the eNodeB—eNB—in LTE) is often used to control the level of connectivity provided between the UE and the RAN, and between the RAN and the CN.

For example, in the context of a UMTS network, five RRC states are defined to represent the level of connectivity between a UE, the UTRAN, and the core network. Four out of the five RRC states are categorized as "RRC Connected" mode in which connectivity is established between the UTRAN and the CN for the UE. The remaining state is categorized as "Idle" mode in which the UE is not connected to the UTRAN and to the CN. The five UMTS RRC states are listed below in an order of a decreasing level of connectivity:

Cell_DCH state (RRC Connected Mode): In this state, full user-plane connectivity is established between the UE and the core network (through the radio access network). All associated bearers are established between the UE and the plurality of involved network nodes within the connection path (e.g. Uu, Tub, Iu, Gn, Gi interfaces). The UE has near-immediate access to dedicated or shared radio resources. The location of the UE is known to the cell level by the radio access network, and the network is in control of cell-level mobility (known as network-controlled handover). UE power consumption in this state is relatively high.

Cell_FACH state (RRC Connected Mode): In this state, a low level of user-plane connectivity is possible using small amount of shared or common radio resources. Associated bearers remain established between the UE and the plurality of involved network nodes within the connection path. The location of the UE is known to the cell level but the UE is able to autonomously control its cell-level mobility (known as cell re-selection). A DRX pattern may be employed to assist with power saving (DRX refers to discontinuous reception in which predetermined cyclic period of "on" and "off" periods are configured for a UE receiver. During a DRX "on" period, a UE reception of paging and control channel messages is attainable).

Cell_PCH state (RRC Connected Mode): In this state, while the necessary bearers for user-plane communications through the radio access network may remain established, no radio resources are available for data transfer. As such, there is no data activity in this state; user-plane communication requires a transition to either cell_FACH or cell_DCH. In cell_PCH, the UE periodically listens to a paging channel (according to a known DRX cycle) such that it may receive notifications of a need to transition to a more active state while saving as much power as possible. The location of the UE is known to cell level, and mobility is autonomously controlled by the UE.

URA_PCH state (RRC Connected Mode): This state is substantially the same as cell_PCH except that the location of the mobile is known only to a (typically large) group of cells known as a routing area. Mobility remains autonomously controlled by the UE. Significant power savings (on top of those achievable in cell_PCH) are possible in this state due to the fact that the UE only needs to inform the network of a location update for each new routing area (rather than a location update each time a new cell is entered).

Idle state/mode: In one particular embodiment of this state, a UE is registered to a network (e.g. UMTS network), but is not actually active. The user-plane connectivity is not established. No resources are assigned to the UE and a DRX pattern is used in order to conserve power. User-plane connectivity between the radio access network and the core network is not required; hence Uu, Iub and Iu interfaces are not established. The UE camps on a UTRAN cell and retains an attachment context with the core network such as to facilitate "always-on" connectivity (i.e. the device is reachable and its IP address is preserved), even when in idle mode. The core network tracks the location of the UE to routing area level. User-plane communication requires re-establishment of the necessary radio and access bearers and a transition to either cell_FACH or cell_DCH state. (Generally, the term "radio bearer" refers to radio resources (e.g. radio channels) assigned to the UE and the network for the transfer of user or control data with a defined Quality of Service (QoS). And, the term "access bearer" refers to radio resources assigned between the UE and a node in the access network).

Details of UMTS RRC terminal states and transitions are described in 3GPP Technical Specification 3GPP TS 25.331, Radio Resource Control Protocol specification, v10.5.0, September 2011, which is herein incorporated by reference in its entirety.

For example, in the context of an LTE network, two RRC states are defined to represent the level of connectivity between a UE, the E-UTRAN, and the core network (also known as EPC). One state is categorized as "E-UTRA RRC Connected" mode in which connectivity is established between the E-UTRAN and the EPC for the UE. The other state is categorized as "E-UTRA RRC Idle" mode in which the UE is not connected to the E-UTRAN and to the EPC. The two LTE RRC states are listed below:

E-UTRA RRC Connected Mode: In this state, full user-plane connectivity is established between the UE and the core network (through the radio access network). All associated bearers are established between the UE and the plurality of involved network nodes within the connection path (e.g. Uu, S1, S5/S7 interfaces). The UE has near-immediate access to dedicated or shared radio resources. The location of the UE is known to the cell level by the radio access network, and the network is in control of cell-level mobility (known as network-controlled handover). UE power consumption in this state may be relatively high.

E-UTRA RRC Idle Mode: In this state, a UE is registered to an LTE network, but not actually active. The user-plane connectivity is not established. No resources are assigned to the UE; an idle-mode DRX pattern is used in order to conserve power. User-plane connectivity between the radio access network and the core network is not required; hence Uu, S1 and S5/S7 interfaces are not established. The UE camps on an E-UTRAN cell and retains an attachment context with the core network such as to facilitate "always-on" connectivity (i.e. the device is reachable and its IP address is preserved), even when in idle mode. The location of the mobile is known by the CN to the tracking area level; but the UE is able to autonomously control its cell-level mobility (known as cell re-selection). The UE updates the CN whenever it camps on a cell located within a new tracking area. User-plane communication requires re-establishment of the necessary radio and access bearers and a transition to the "E-UTRA RRC Connected Mode" state.

Details of LTE RRC terminal states and transitions are described in 3GPP Technical Specification 3GPP TS 36.331, Radio Resource Control Protocol specification, v11.0.0, June 2012, which is herein incorporated by reference in its entirety.

After a UE has selected a PLMN, it performs typical idle mode operations: performs cell selection to search for a suitable cell (i.e., serving cell) on which to camp, acquires SIB messages for parameters configured for cell selection/re-selection operations, optionally performs cell re-selection measurements after the UE camps on a serving cell, and monitors a paging channel to detect incoming calls. The UE may subsequently establish an RRC connection with the network, for example, to establish a call or transfer data.

In the context of 3GPP radio access technologies (i.e., GERAN, UTRAN, and E-UTRAN), idle mode cell selection and re-selection operations are generally performed after a UE has camped on a serving cell. These operations aim to place the UE to a cell in the selected PLMN and its equivalent PLMNs that provides the "best" quality of service. The operations typically comprise a number of common stages that are broadly the same regardless of the RAT involved. Each of these common stages constitutes a decision point, either in the UE or in the network. In an initial stage, serving cell quality is monitored and evaluated on a periodic basis. If the serving cell quality is satisfactory (i.e., above a threshold configured by the network), then no further action is needed. However, if the serving cell quality is below the configured threshold, cell re-selection is performed in subsequent stages. In a second stage, the UE searches for candidate neighbour cell to move to. The UE evaluates the carrier frequencies of all radio access technologies (RATs) of neighbour cells based on pre-determined priorities. For example, the UE may evaluate neighbour cells on the same frequency (intra-frequency cells) and, subsequently, neighbour cells on other frequencies (inter-frequency cells) of the same RAT in which the UE is currently operating. The UE may additionally evaluate neighbour cells of one or more other RATs (inter-RAT cells) than that of the cell in which the UE is currently operating. If some neighbour cells are identified, a third stage is performed. In this stage, service quality, such as signal strength or quality, for the identified neighbour cells is measured periodically. In a fourth stage, the UE compares the neighbour cells on the relevant frequencies based on a predetermined ranking criterion, such as signal strength quality and cell priority. A decision is then made by the UE on whether or not the UE should move to another serving cell.

FIG. 1 illustrates an existing procedure of neighbour cell measurement used in an idle mode cell re-selection operation in an UMTS mobile communication network. A UE is shown physically moving from a serving cell area toward a neighbour cell area. The serving cell and the neighbour cell are both UTRA FDD (frequency-division duplex) cells in an UMTS network in this example. Cell quality value parameter Qqualmeas expressed in CPICH Ec/No [dB] is measured on the UE while it moves from the serving cell area toward the neighbour cell area. CPICH stands for common pilot channel in UMTS and other mobile communication systems. CPICH Ec/No is defined as the received energy per chip (Ec) on the P-CPICH (Primary CPICH) of a given cell divided by the total noise power density (No) on the UMTS carrier. CPICH Ec/No is used mainly to rank different UMTS FDD candidate cells according to their service quality and is typically used as an input for a cell re-selection decision. The detailed definition of CPICH Ec/No is described in 3GPP Technical Specification 3GPP TS 25.215, Technical Specification Group Radio Access Network Physical Layer Measurement (FDD) (Release 10). Also illustrated in FIG. 1 are cell quality parameter thresholds "Qqualmin" [dB] and "Sintrasearch" [dB]. "Qqualmin" represents the minimum required quality in the cells. "Sintrasearch" specifies the cell quality threshold (measured above "Qqualmin"), below which an intra-frequency neighbour cell measurement should be performed in a UE in order to make a cell re-selection decision. In the current example, the minimum required cell quality "Qqualmin" of the serving cell and of the neighbour are shown as the same. In other examples, "Qqualmin" of a serving cell may be different from that of a neighbour cell.

According to the 3GPP Technical Specification 3GPP TS 25.304 which is incorporated herein by reference in its entirety, a neighbour cell measurement criterion for cell re-selection, for example for UMTS FDD cells, is defined as the following:

If Squal>Sthreshold, UE chooses not to perform intra-frequency measurements.
If Squal<=Sthreshold, UE performs intra-frequency measurements.
If Sthreshold is not sent for serving cell, then perform intra-frequency, neighbour cell or mobility measurements.

Where:
Sthreshold=Sintrasearch or Sintersearch or SsearchRATm for intra-frequency, inter-frequency and inter-RAT neighbour cell measurement respectively Squal [dB] =Qqualmeas (Qqualmin[+Qqualminoffset]);
Qqualmeas—Measured cell quality value expressed in CPICH Ec/No [dB], as described above;
Qqualmin—Minimum required quality level in the cell [dB], as described above;
Qqualminoffset—Offset to the signalled Qqualmin which is taken into account in the Squal evaluation, for example as a result of a periodic search for a higher priority mobile network (e.g. PLMN) while camped normally on a visited mobile network (e.g. VPLMN); and Thus, if Sthreshold is received, then a criterion for determining whether to perform neighbour cell measurement is:

$$Q\text{qualmeas} \leq S\text{threshold} + (Q\text{qualmin}[+Q\text{qualminoffset}])$$

If satisfied, then neighbour cell measurement is performed.

The above neighbour cell measurement criterion for cell re-selection is graphically illustrated in FIG. 1. As shown in FIG. 1, intra-frequency cell measurement starts at point "A" where condition Squal<=Sintrasearch is met. UE performs intra-frequency cell measurements continually while the UE moves from the serving cell toward the neighbour cell. Neighbour cell re-selection is triggered in UE when it reaches cross point "B" where measured cell quality "Qqualmeas" of the neighbour cell is better than that of the serving cell. In other examples reseelction may be delayed by a Treselection delay, or a hysteresis value. In another example, measurement parameter threshold "Sintersearch" may be configured for inter-frequency neighbour cell measurements in UMTS FDD cells. The corresponding measurement criterion is described in 3GPP Technical Specification 3GPP TS 25.304. In a further example, measurement parameter threshold "Snonintrasearch" may be configured for E-UTRAN inter-frequency or inter-RAT neighbour cell measurements in an LTE network. The corresponding measurement criterion is described in 3GPP Technical Specification 3GPP TS 36.304.

In the above existing procedures of neighbour cell measurement performed in an idle mode cell re-selection operation, a few common practices are carried out in various existing networks, such as GSM, UMTS and LTE networks, regardless of the RATs involved (e.g. GERAN, UTRA, E-UTRA). Moreover, these common practices apply to the neighbour cell measurements of various types, such as, intra-frequency, inter-frequency and inter-RAT measurements. For example, measurement parameters for a cell and their corresponding measurement thresholds, such as "Sintrasearch", "Sintersearch" and "Snonintrasearch" are predetermined by the network and provided to a UE in one or more System Information messages that are broadcasted within the cell. These measurement thresholds are predominantly configured through a manual process (e.g., field test or measurements) by a network operator on a per cell basis. In an existing practice, the measurement thresholds for a certain cell are configured not too high in order to conserve UE battery life, and not too low to harm the average serving cell quality. Once the measurement thresholds are configured for the cell, their values remain unchanged regardless of the UE or cell condition changes, such as UE mobility, interference level or traffic load change in a cell. In some existing practices, network operators are commonly inclined to set measurement thresholds on the high side to secure a desirable average serving cell quality, while overlooking the reduced battery life on the UEs. In other existing practices, measurement thresholds are not configured by the network operator for some cells in a network. This may be due to the high cost associated with the current manual practice in measurement threshold setting. According to the current 3GPP Technical Specification 3GPP TS 25.304, section 5.2.6.1.1, under this scenario a UE is required to perform neighbour cell measurements all the time even if the UE is camped on a strong serving cell. User experience of shortened battery life is ignored. Additionally, as the mobile communication technology evolves, the provision of self-optimizing networks (SON) is a high priority for network operators in order to deal with the increasing complexity of network configuration and optimization. Automated processes are in rising demand to replace manual processes in performing the network configuration and optimization. The 3GPP has introduced increasing requirements for UTRAN and E-UTRAN networks to support the SON concepts. For example, the use case of automatic neighbour relation and mobility optimization are addressed in recent releases of SON. The details of SON functionality may be found in 3GPP Technical Specification 3GPP TS 36.902 (LTE standard), and 3GPP Technical Specification TS 32.521(UMTS and LTE standards).

FIGS. 2, 3A, 3B and 3C illustrate flowchart representative of example processes that may be executed to perform idle mode neighbour cell measurement and cell re-selection operations according to this disclosure. In these examples, the process represented by each flowchart may be implemented by one or more programs comprising machine readable instructions for execution by a processor, such as the processor 712 shown in the example processing system 700 discussed below in connection with FIG. 6. Alternatively, the entire program or programs and/or portions thereof implementing one or more of the processes represented by the flowcharts of FIGS. 2, 3A, 3B and 3C could be executed by a device other than the processor 712 (e.g., such as a controller and/or any other suitable device) and/or embodied in firmware or dedicated hardware (e.g., implemented by an ASIC, a PLD, a CPLD, an FPLD, an FPGA, discrete logic, etc.). Also, one or more of the processes represented by the flowchart of FIGS. 2, 3A, 3B and 3C, or one or more portion(s) thereof, may be implemented manually. Further, although the example processes are described with reference to the flowcharts illustrated in FIGS. 2, 3A, 3B and 3C, many other techniques for implementing the example methods and apparatus described herein may alternatively be used. For example, with reference to the flowcharts illustrated in FIGS. 2, 3A and 3B, the order of execution of the blocks may be changed, and/or some of the blocks described may be changed, eliminated, combined and/or subdivided into multiple blocks.

As mentioned above, the example processes of FIGS. 2, 3A, 3B and 3C may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 2, 3A, 3B and 3C may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Also, in the context of the current disclosure, as used herein, the terms "computer readable" and "machine readable" are considered technically equivalent unless indicated otherwise.

Figure 2:
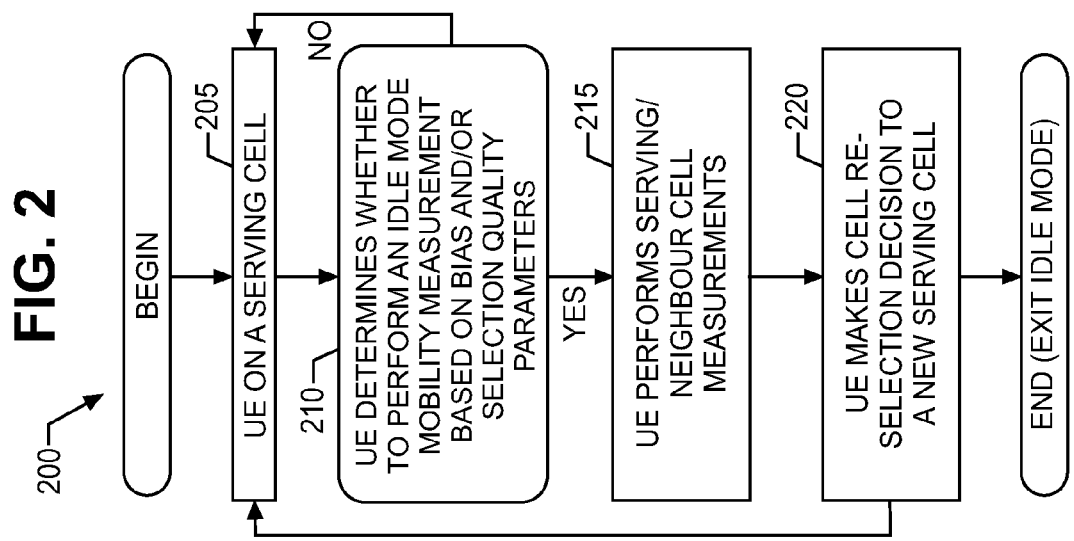
FIG. 2 is a flowchart representative of an example process that may be performed to decide whether to implement the example UE mobility measurements.

FIG. 2 illustrates an example process 200 that may be executed to implement the example idle mode mobility measurements on serving and neighbour cells and cell re-selection operation according to the present disclosure. FIG. 2 begins execution at block 205 at which an example UE has registered to an example mobile communication network, such as a public land mobile network (PLMN), and has camped on a serving cell for mobile communication service. The PLMN may be an existing or future mobile network that is compliant with the Third Generation Partnership Project (3GPP) specifications. In one example, the cell the UE camps on may be a GERAN cell corresponding to the second generation GSM mobile communication network or, more generally, a 2G cell. In another example, the cell the UE camps on may be a UTRAN cell corresponding to the third generation UMTS mobile communication network or, more generally, a 3G cell. More specifically, the 3G cell may be an UMTS FDD (frequency division duplex) cell or an UMTS TDD cell (time division duplex). In a further example, the cell the UE camps on may be an E-UTRAN cell corresponding to the fourth generation LTE mobile communication network or, more generally, a 4G cell. More specifically, the 4G cell may be an LTE FDD cell or an LTE TDD cell. In an additional example, the cell the UE camps on may be one that corresponds to other 3GPP-compliant mobile networks, such as a TD-SCDMA network or its variants, a TD-LTE network or its variants. In yet another example, the cell the UE camps on may be one that corresponds to a non-3GPP-compliant mobile network, such as a cdma2000 network or its variants. In above examples, the cell on which the example UEs camp may be a regular 3G or 4G cell (NodeB, eNodeB) or a 3G or 4G femtocell (Home NodeB, Home eNodeB). In the context of an LTE network, an example UE that camps on the serving cell is in E-UTRA RRC Idle mode and is expected to perform neighbour cell measurement and cell re-selection, for example, to maintain its radio attachment to the core network (i.e., EPC) or to update the EPC about its current tracking area. In the context of an UMTS network, an example UE that camps on the serving cell may be in idle state or one of the less active states of URA_PCH, CELL_PCH, or CELL_FACH, and is expected to perform neighbour cell measurement and cell re-selection, for example, to maintain or increase its level of connectivity with the network. In one particular example, the terminology "idle mode" is generally used to refer to the RRC state on the UE prior to neighbour cell measurement and cell re-selection.

At block 210, the UE determines whether to perform a mobility measurements, e.g. an idle mode mobility measurement, by analysing information received from the communication network, such as one or other or both of a bias parameter and a selection quality parameter. The bias parameter may be Qoffset, or QoffsetXs,n, whereby X is an integer (as explained below). The selection quality parameter may be Squal. There may be a threshold value for each of the bias parameter and selection quality parameter which defines (above or below) whether a mobility measurement is to be performed. There may be a predefined relationship between the bias parameter and the selection quality parameter, which defines whether or not a mobility measurement is to be performed. A determination is made based on the value of one or both of the bias parameter and the selection quality parameter as to whether the mobility measurement is to be performed. Example predefined relationships are shown in FIGS. 7a to 7g below. However, it will be appreciated that a key aspect is simply the use of one or other or both of a bias parameter and a selection quality parameter, as may be received from the communication network, to determine whether or not to perform a mobility measurement, and the specific relationships themselves could be numerous and varied.

Performance of Block 210 is achieved by executing one or more processes locally inside the UE measurement system. An example UE measurement system 505 is illustrated below in connection with FIG. 4. The information received from the network is used to determine whether to perform idle mode mobility measurements may be contained in the SIB received from a given cell, and may or may not include one or more of the parameter thresholds generally refer to as "Sthreshold", e.g. "Sintrasearch", "Sintersearch" and "Snonintrasearch", used for UMTS FDD cell re-selection mentioned above. In the context of the present disclosure, the specific information from the SIB that is used for idle mode mobility measurement determination may include one or more of:

(i) a bias parameter of each neighbour cell such as, for example, Qoffset, or QoffsetXs,n, whereby X is an integer (as explained below); and (ii) a hysteresis parameter such as Qhyst, or QhystXs, whereby X is an integer (as explained below), and an additional current measured value that might be used in the determination is:

(iii) a measured serving cell signal quality or power parameter, such as Qqualmeas, i.e. the measured signal quality as determined by the UE.

In the above, X is an integer which corresponds to the type measurement for which the parameter is used. The value 1 (i.e. Qhyst1s), for example, is used for RSCP (Received Signal Code Power) and the value 2 (i.e. Qhyst2s), for example, is used for Ec/No (Energy per Chip/Noise). QoffsetXs,n and QhystXs may be specified in decibels (dB) and may take positive, negative (QoffsetXs,n only) or zero values. In particular, and as explained below in connection with FIGS. 3A, 3B and 3C, the UE may compare, for each neighbour cell, its bias parameter to a threshold value, or compares each bias parameter for each neighbour cell in conjunction with the hysteresis parameter for the current serving cell against a threshold, or compares the serving cell signal quality parameter against one or both of the bias parameter for each neighbour cell and hysteresis parameter.

If the determination to perform an idle mode mobility measurement is negative, then the UE continues to camp on the existing serving cell and receive SIB messages from the network, and does not perform (or suppresses if performing previously) the corresponding mobility measurements.

At block 215, if the determination to perform the mobility measurement from block 210 is positive, then the UE performs serving cell quality measurement and starts neighbour cell measurements, or continues to perform such mobility measurements if it was previously already performing them. The measurements are mainly used to rank the different candidate neighbour cells according to their signal strength or quality for re-selection decisions. In one example, serving cell and neighbour cell quality are accessed via cell power parameters, such as RSCP (Received Signal Code Power) for UMTS FDD cell measurement or RSRP (Reference Signal Received Power) for LTE cell measurement. In another example, serving cell and neighbour cell quality are accessed via cell quality parameters, such as UMTS FDD Ec/No cell measurement described previously with respect to FIG. 1 or RSRQ (Reference Signal Received Quality) for LTE cell measurement. When performing neighbour cell measurements the UE may evaluate any combination of intra-frequency cells, inter-frequency cells and inter-RAT cells according to a pre-defined order of priority. For example, the intra-frequency cell measurements that the UE is expected to perform may include measurements on neighbour cells having the same frequency of the same RAT in which the UE is currently operating. Also, the inter-frequency cell measurements that the UE is expected to perform may include measurements on neighbour cells of one or more other frequencies of the same RAT in which the UE is currently operating. Furthermore, the inter-RAT cell measurements that the UE is expected to perform may include measurements on neighbour cells of one or more other RATs than that in which the UE is currently operating. At the end of this step, one or more candidate neighbour cells may be identified for idle mode cell re-selection decision. At block 220, the UE compares the candidate neighbour cells on the relevant frequencies based on a pre-defined ranking criterion, such as signal power, signal quality, and cell priority. The UE then makes a decision to perform cell re-selection and camp on a new serving cell. If the idle mode is complete or ended, then the process 200 ends.

It is noted that, when a UE performs the steps in the example process 200 for idle mode neighbour cell measurements, suitable SIB configuration parameters are obtained at each execution of an iteration of the process flow, such as "QoffsetXs,n", and "QhystXs".

According to the current disclosure, various processes may be employed for the processing at block 210. Example processes that may implement at least a portion of the processing at block 210 are illustrated with respect to FIGS. 3A, 3B and 3C, which are described in greater detail below.

Figure 3A:
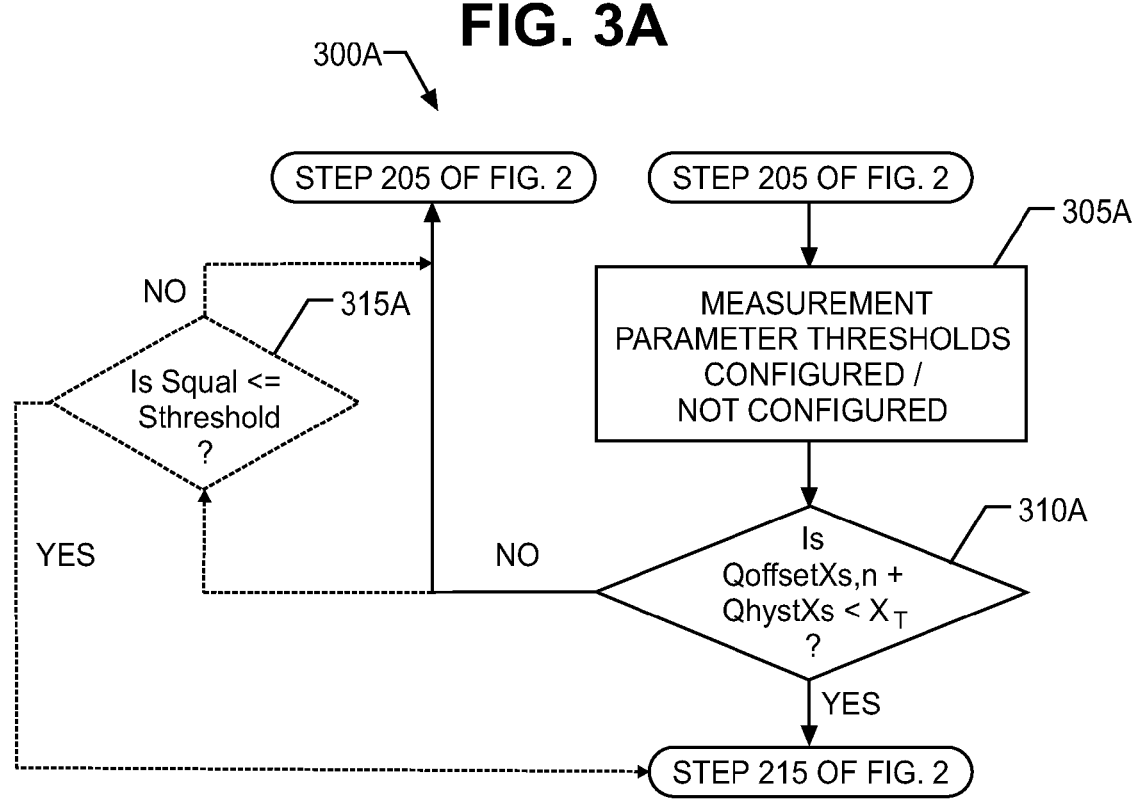
FIG. 3A is a flowchart representative of an example process that may be performed to implement a decision about whether to perform UE mobility measurements.

An example process 300A that may be used to determine whether to perform idle mode mobility measurement at block 210 of FIG. 2 is illustrated in FIG. 3A. With reference to the preceding figures and associated descriptions, the process 300A of FIG. 3A begins execution at block 305A. In one example, a UE receives a SIB message from the network in which one or more idle mode mobility measurement parameter thresholds ("Sthreshold") such as "Sintrasearch", "Sintersearch", "SinterRATsearch" and "Snonintrasearch" are not configured. In another example, the UE receives a SIB message from the network in which one or more of the thresholds ("Sthreshold"), such as "Sintrasearch", "Sintersearch", "SinterRATsearch" and "Snonintrasearch" are configured. In another example, one or more thresholds ("Sthreshold") is fabricated by the UE (see below). The UE may: (i) choose to ignore one or more of these threshold values as configured by the network or fabricated by the UE, or (ii) make a further determination based on one or more of these thresholds as to whether to perform neighbour cell measurement (as explained below). In each one of the above scenarios (whether or not Sthreshold has been received), the UE reads the SIB message and stores the SIB message in a local storage inside the UE measurement system (for subsequent processing as detailed below), such as the example system information (SIB) subsystem/storage 520 of the example UE measurement system 505 discussed below with respect to FIG. 4.

At block 310A, the UE may determine whether QoffsetXs, n is less than a threshold value, $X_T$, which may be zero. Alternatively, the UE may determine whether QoffsetXs,n+QhystXs is less than (or less than or equal to) a threshold value, $X_T$, which may be zero. If the aforementioned determination is positive, then the UE will perform (or continue to perform) mobility measurements and the UE then proceeds with step 215 of FIG. 2. However, if the aforementioned determination is negative, in one embodiment as indicated by the dashed lines, the UE determines at block 315A whether Squal<=Sthreshold. Optionally, this determination may include a determination including a constant value, such as W, i.e. Squal<=Sthreshold +W, where W may be set to any positive or negative value, e.g. W may be in the range −5 or 0 to 5, −4 or 0 to 4, −3 or 0 to 3, −2 or 0 to 2, −1 or 0 to 1, −0.5 or 0 to 0.5, −0.1 or 0 to 1. In this scenario, Sthreshold has either been conveyed to the UE or fabricated within the UE (see below). If the determination that Squal<=Sthreshold [optionally+W] is positive, then the UE proceeds with step 215 of FIG. 2. If the determination is negative (or the determination in block 315A is not being performed), then the UE does not perform (or suppresses) the taking of mobility measurements, and returns to step 205 of FIG. 2 to camping on a serving cell and receiving network configuration messages from the network via the serving cell, whilst remaining in its idle mode.

Figure 3B:
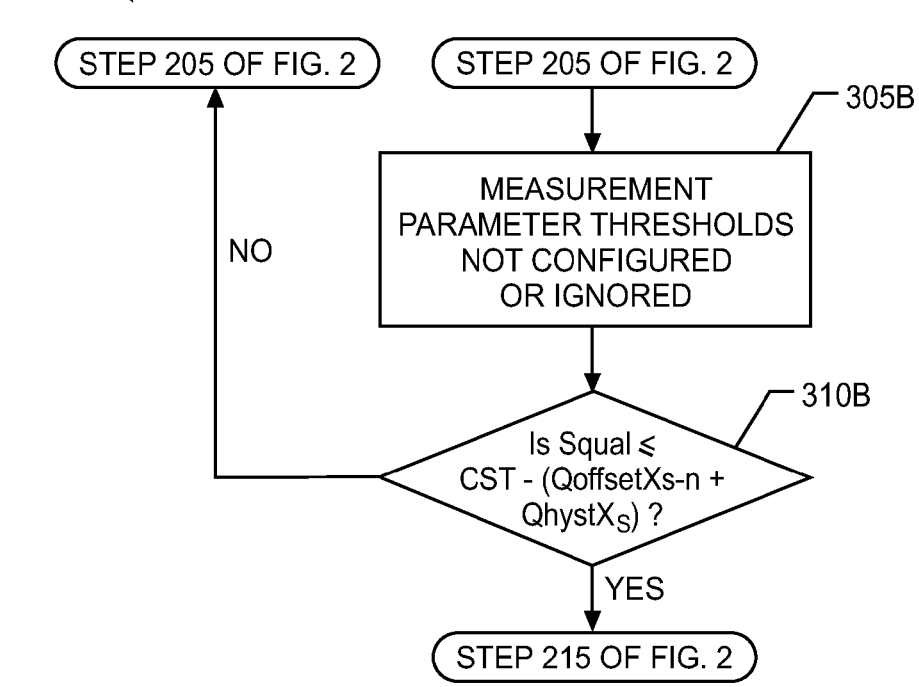
FIG. 3B is a flowchart representative of an example process that may be performed to implement a decision about whether to perform UE mobility measurements.

An example process 300B that may be used to determine whether to perform idle mode mobility measurement at block 210 of FIG. 2, when a mobility measurement parameter threshold is not received or configured, or is ignored, is illustrated in FIG. 3B. With reference to the preceding figures and associated descriptions, the process 300B of FIG. 3B begins execution at block 305B. The UE receives a SIB message from the network in which one or more idle mode mobility measurement parameter thresholds ("Sthreshold") such as "Sintrasearch", "Sintersearch", "SinterRATsearch" and "Snonintrasearch" are not configured, or not included. Alternatively, one or more thresholds ("Sthreshold"), even if received, are ignored, for example when QhystXs+QoffsetXs,n is a very large value, e.g. greater than 10 dB, 15 dB, 20 dB, 25 dB, 30 dB, 35 dB or 40 dB.

At block 310B, the UE may determine whether Squal is less than (or less than or equal to) cell search threshold value (CST)−(QoffsetXs,n+QhystXs). As mentioned above, the cell search threshold (CST) may equate to Qqualmin+ Sthreshold, but Sthreshold may be ignored, or not even have been received or configured, in which case the determination is thus whether Squal is less than (or less than or equal to) Qqualmin−(QoffsetXs,n+QhystXs). Moreover, Qqualmin may also be ignored if QhystXs+QoffsetXs,n is a very large value, e.g., greater than 10 dB, 15 dB, 20 dB, 25 dB, 30 dB, 35 dB or 40 dB, in which case the determination is thus whether Squal is less than (or less than or equal to) (QoffsetXs, n+QhystXs). If the aforementioned determination is positive, then the UE will perform (or continue to perform) mobility measurements and the UE then proceeds with step 215 of FIG. 2. However, if the aforementioned determination is negative, the UE does not perform (or suppresses) the taking of mobility measurements, and returns to camping on a serving cell and receiving network configuration messages from the network via the serving cell, whilst remaining in its idle mode.

Figure 3C:
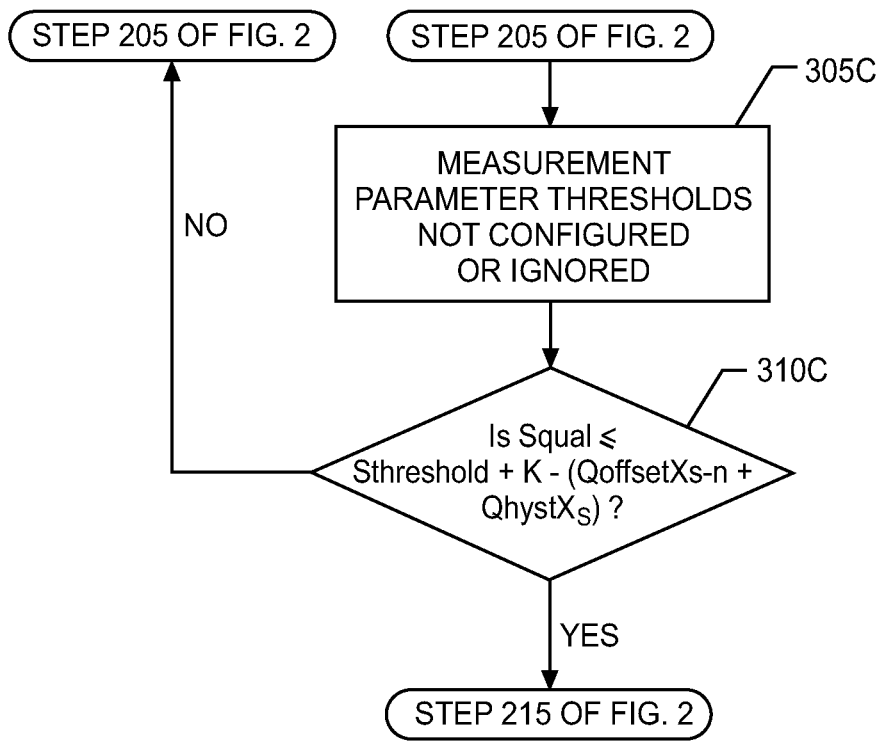
FIG. 3C is a flowchart representative of an example process that may be performed to implement a decision about whether to perform UE mobility measurements.

Another example process 300C that may be used to determine whether to perform idle mode mobility measurement at block 210 of FIG. 2, when a mobility measurement parameter threshold is received, configured, or fabricated by the UE is illustrated in FIG. 3C. With reference to the preceding figures and associated descriptions, the process 300C of FIG. 3C begins execution at block 305C. In one example, the UE receives a SIB message from the network in which one or more of the thresholds ("Sthreshold"), such as "Sintrasearch", "Sintersearch", "SinterRATsearch" and "Snonintrasearch" are configured by the network. In another example, one or more thresholds ("Sthreshold") is fabricated by the UE (see below). The UE now makes a further determination based on one or more of these thresholds as to whether to perform neighbour cell measurement (as explained below). In each one of the above scenarios (whether or not Sthreshold has been received), the UE reads the SIB message and stores the SIB message in a local storage inside the UE measurement system (for subsequent processing as detailed below), such as the example system information (SIB) subsystem/storage 520 of the example UE measurement system 505 discussed below with respect to FIG. 4.

At block 310C, the UE determines whether Squal is less than (or less than or equal to) Sthreshold+K−(QoffsetXs,n+ QhystXs). Here K is defined as a constant which permits, for example, in the scenario where (QhystXs+QoffsetXs,n) is negative, the UE to effectively lower the determination threshold (relative to serving cell) for initiating measurement, or if (QhystXs+QoffsetXs,n) is positive, then the determination threshold could be higher. Suitable values of K may equate to Qqualmin or another threshold value which may be fixed as, for example: 0 dB, −5 dB, −10 dB, −15 dB, or −20 dB If the aforementioned determination in block 310C is positive, then the UE will perform (or continue to perform) mobility measurements and the UE then proceeds with step 215 of FIG. 2. However, if the aforementioned determination in block 310C is negative, the UE does not perform (or suppresses) the taking of mobility measurements, and returns to camping on a serving cell and receiving network configuration messages from the network via the serving cell, whilst remaining in its idle mode, as per step 205 of FIG. 2.

As mentioned above, in certain scenarios, one or more measurement parameter thresholds, such the Sthreshold parameters, can be fabricated or generated by the UE. Such generation or fabrication of these parameters can be in accordance with the method disclosed and claimed in: co-pending U.S. patent application Ser. No. 13/357,409 and European patent application no. 12152338.5, both of which were filed on 24 Jan. 2012 and which are incorporated by reference in their entirety.

Figure 4:
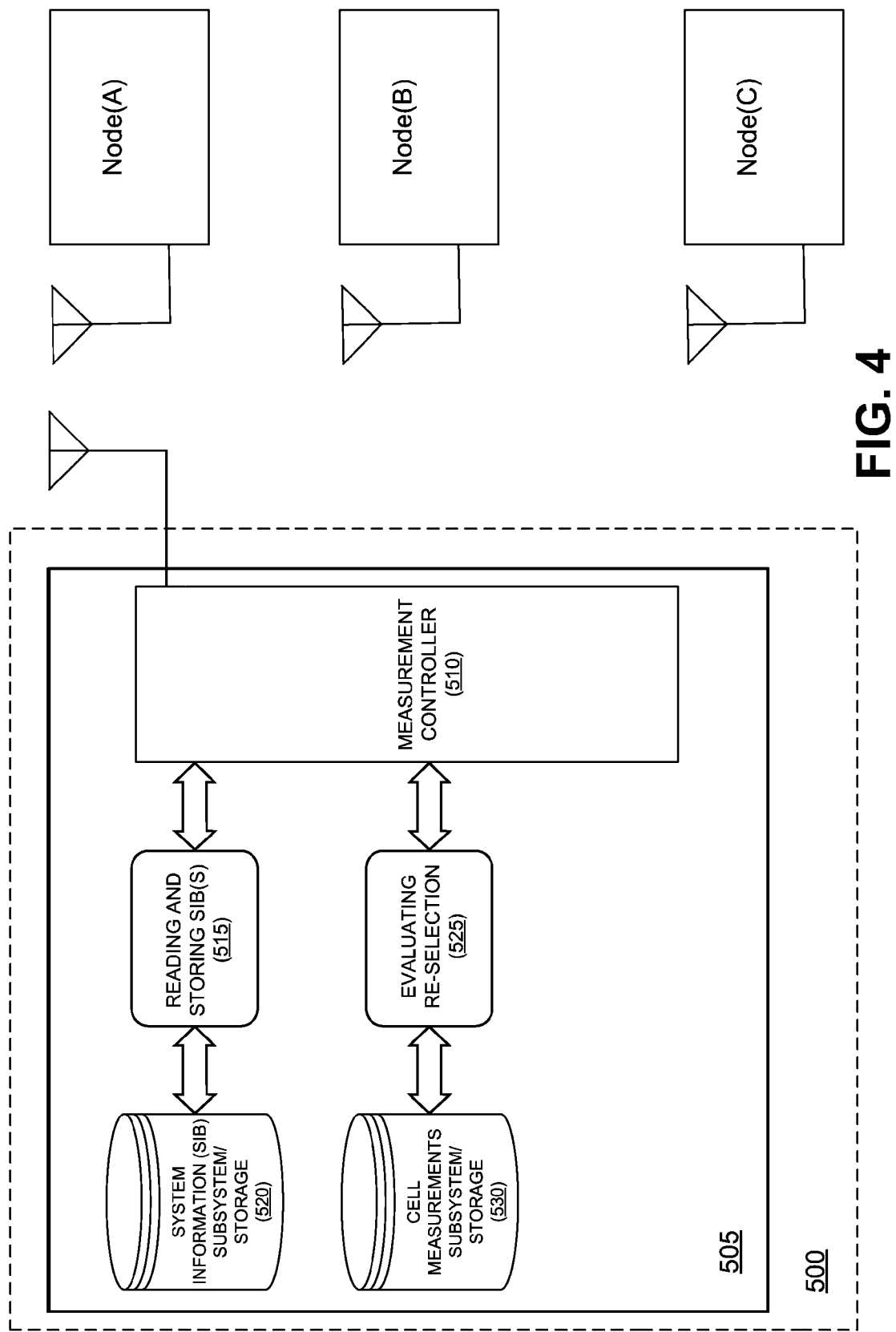
FIG. 4 is a block diagram of at least a portion of the example UE that can be used to implement the example UE mobility measurements.

FIG. 4 illustrates an example implementation of a UE 500 that supports idle mode neighbour cell measurements and cell re-selection operations as disclosed above. UE 500 comprises a UE measurement system 505 that may be implemented in any type of UE (mobile device), such as any type of wireless communication device, such as a smartphone, a tablet computer, a mobile telephone device that is portable, a mobile computing device that is portable, a mobile telephone device implementing a stationary telephone, a personal digital assistant (PDA), etc. As discussed previously, prior UEs may implement existing idle mode mobility measurements and neighbour cell re-selection operations in which measurement thresholds are statically configured in a SIB message broadcasted from the network. Unlike such prior UEs, the UE 500 of the illustrated example implements one or more example idle mode mobility measurement techniques, and/or combinations thereof, that applies, at least in part, UE-configured parameter thresholds for which neighbour cell measurement is to be performed. Furthermore, the UE-configured parameter thresholds may be dynamically updated to provide a better suitable parameter threshold for idle mode mobility measurement in a serving cell.

For example, to implement idle mode mobility measurements as disclosed above, the UE 500 illustrated in the example of FIG. 4 includes an example UE measurement system 505. The UE 500 is configured to communicate with one or more base stations, such as Node (A), Node (B) and Node (C) in a PLMN network. In an example, the UE measurement system 505 includes an example measurement controller 510, which may be configured to receive SIB messages from Node (A) of its serving cell. In another example, a measurement information receiver (not shown) may be implemented in the measurement controller 510 by any type of receiver capable of receiving and decoding broadcast and/ or dedicated signaling messages conveying the list(s) specifying the set of one or more frequencies for which measurements for UE-controlled cell re-selection is to be performed. For example, measurement controller 510 can correspond to any implementation capable of receiving and decoding broadcast UTRAN SIB messages (e.g., Type 3, 4, 11, 11bis, 12 and/or 19 messages), broadcast GERAN SI messages (e.g., SI-2 ter, and SI-2 quater messages), dedicated UTRAN MOBILITY INFORMATION messages, GERAN Measurement Information and/or GERAN Packet Measurement Order messages, etc. The SIB messages UE 500 received from the network nodes, such as base station Node (A) may include measurement configuration information, such as one or more neighbour cell list(s), specifying one or more frequencies of neighbour cells for which a mobile network expects idle mode measurements to be performed. The received measurement configuration information in the SIB messages may also include configured measurement thresholds from the network, such as one or more minimal required cell quality values, and/or one or more allowed maximum threshold values, and/or one or more sets of limits and/or ranges of the parameter thresholds that correspond to one or more idle mode mobility measurement parameters. The received measurement configuration information may further include an indication (e.g., a flag or other predefined variable) that instructs the UE 500 to derive desired measurement thresholds through internal algorithms.

The example UE measurement system 505 illustrated in FIG. 4 also includes an example reading and storing SIB(S) module 515 that reads the SIB messages received and processed by measurement controller 510 and saves the SIB messages in system information (SIB) subsystem/storage 520. The system information (SIB) subsystem/storage 520 can store the measurement configuration information obtained from the network in any appropriate data format. The UE measurement system 505 illustrated in FIG. 4 also includes example evaluating re-selection module 525 that collects the serving cell power parameter value (e.g., RSCP, RSRP) and/or quality parameter value (e.g., Ec/No, RSRQ) measured at every successful cell re-selection, and then stores the re-selection history data (i.e., the collected serving cell power/quality parameters) in cell measurement subsystem/storage 530.

The example implementation of the UE measurement system 505 of UE 500 is further illustrated in FIG. 4 along with the message sequence chart in FIG. 5. A UE 500 has registered to a PLMN network and camped on a serving cell, such as Node(A). The user-plane connectivity is not established; UE 500 is in idle mode. UE 500 receives a SIB message from its current serving cell Node(A) and identifies whether or not certain idle mode mobility measurement thresholds (e.g., Sintrasearch) are configured or not configured (or set) in the SIB message. The received SIB message may also include one or more minimal required cell quality values, and/or one or more allowed maximum threshold values, and/or one or more sets of limits and/or ranges of the parameter thresholds that correspond to one or more idle mode mobility measurement parameters, and may also include: a bias parameter of each neighbour cell such as, for example, QoffsetXs,n, and a hysteresis parameter such as QhystXs. Measurement controller 510 may then save the SIB message in system information (SIB) subsystem/storage 520 via the reading and storing module 515. Measurement controller 510 may then determine whether or not to perform idle mode mobility measurements by utilising one or more of: cell quality (e.g., signal power parameters RSCP, RSRP, or signal quality parameters Ec/No, RSRQ) on the serving cell; and the bias or hysteresis parameter, and comparison against a predefined or network configurable threshold value.

While example manners of implementing UE 500 has been illustrated in FIG. 4, one or more of the modules, elements, processes and/or devices illustrated in FIG. 4 may be combined, divided, re-arranged, omitted, eliminated and/or implemented in any other way. Further, the example measurement controller 510, the example reading and storing SIB(S) module 515, the system information (SIB) subsystem/storage 520, the evaluating re-selection module 525, the example cell measurements subsystem/storage 530, the example network elements Node (A), Node (B) and Node (C) may be implemented by hardware, software, firmware and/or any combination of hardware, software and/or firmware. Thus, for example, any of the example measurement controller 510, the example reading and storing SIB(S) module 515, the system information (SIB) subsystem/storage 520, the evaluating re-selection module 525, the example cell measurements subsystem/storage 530, the example network elements Node (A), Node (B) and Node (C) could be implemented by one or more circuit(s), programmable processor(s), application specific integrated circuit(s) (ASIC(s)), programmable logic device(s) (PLD(s)), field programmable logic device(s) (FPLD(s)), complex programmable logic device(s) (CPLD(s)), and/or field-programmable gate array(s) (FPGA(s)), etc. In at least some example implementations, at least one of the example measurement controller 510, the example reading and storing SIB(S) module 515, the system information (SIB) subsystem/storage 520, the evaluating re-selection module 525, the example cell measurements subsystem/storage 530, the example network elements Node (A), Node (B) and Node (C) are hereby expressly defined to include a tangible computer readable medium such as a memory, digital versatile disk (DVD), compact disk (CD), etc., storing such software and/or firmware.

In one example, measurement controller 510, the reading and storing module 515, and the evaluating re-selection module 525, are implemented by a known data processing technique, such as the processor 712 of the processing system 700 illustrated in FIG. 6, which is described in greater detail below. In another example, the reading and storing module 515, and the evaluating re-selection module 525 may be respectively implemented as a sub-module of measurement controller 510. In a further example, the features of the reading and storing module 515, and the evaluating re-selection module 525, are incorporated into a single processing device that is similar to processor 712 of the processing system 700 illustrated in FIG. 6. In one example, the reading and storing module 515, and the evaluating re-selection module 525 are "soft" modules that are implemented by executing coded instructions (e.g., computer readable instructions) embodied in a firmware or stored as computer executable instructions on a tangible computer readable medium such as a hard disk drive, a flash memory, a read-only memory (ROM), a CD, a DVD, a cache, a random-access memory (RAM) and/or any other storage media. In another example, the reading and storing module 515, and the evaluating re-selection module 525 are "hard" modules that are implemented as a dedicated hardware device, such as an ASIC, a PLD, a CPLD, an FPLD, an FPGA, discrete logic, etc.

Similarly, the system information (SIB) subsystem/storage 520, and the cell measurements subsystem/storage 530, can be implemented separately as individual storage modules implemented by any type and/or combination of memory and/or storage technology, such as the volatile memory 718 and/or the mass storage device 730 of the processing system 700 illustrated in FIG. 6, which is described in greater detail below. Additionally, the system information (SIB) subsystem/storage 520, and the cell measurements subsystem/storage 530 can be implemented as subsystems of a mass storage device, such as the mass storage device 730 of the processing system 700 illustrated in FIG. 6. Additionally and alternatively, the reading and storing module 515, and the evaluating re-selection module 525, the system information (SIB) subsystem/storage 520, and the cell measurements subsystem/storage 530 can be incorporated with measurement controller 510 into a single processing device that is similar to processor 712 of the processing system 700 illustrated in FIG. 6. Further still, the example UE 500 and/or the example network element Node(A), Node(B) and Node(C) may include one or more elements, processes and/or devices in addition to, or instead of, those illustrated in FIG. 4, and/or may include more than one of any or all of the illustrated elements, processes and devices.

Figure 6:
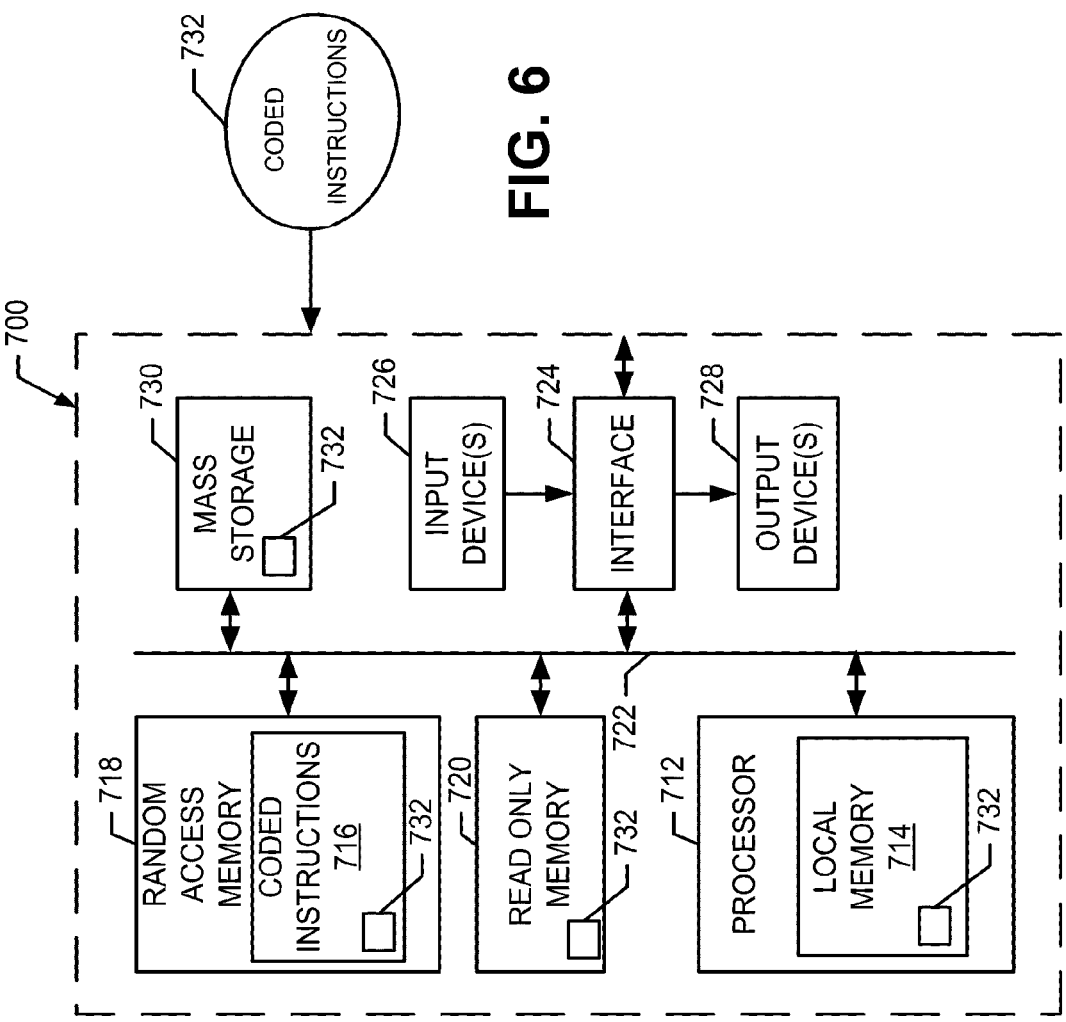
FIG. 6 is a block diagram of an example processing system that may execute example machine readable instructions used to implement one or more of the example UE mobility measurements.

FIG. 6 is a block diagram of an example processing system 700 capable of implementing the apparatus and methods in the mobile device (user equipment (UE)) disclosed herein. The processing unit 700 is comprised in, for example, a smartphone, a tablet computer, a mobile phone, a personal digital assistant (PDA), a server, a personal computer, a mobile telephone device that is portable, a mobile computing device that is portable, a network processing element, or any other type of computing device.

The system 700 of the instant example includes processing unit or processor 712 such as a general purpose programmable processor. The processing unit 712 includes a local memory 714, and executes coded instructions 732 present in the local memory 714 and/or in another memory device. The processing unit 712 may execute, among other things, machine readable instructions to implement the processes represented in FIGS. 2-6. The processing unit 712 may be any type of processing unit, such as one or more Intel® microprocessors from the Pentium® family, the Itanium® family and/or the XScale® family, one or more microcontrollers from the ARM® and/or PICO families of microcontrollers, etc. Of course, other processing units from other families are also appropriate.

The processing unit 712 is in communication with a main memory including a volatile memory 718 and a non-volatile memory 720 via a bus 722. The volatile memory 718 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 720 may be implemented by flash memory and/or any other desired type of memory device. Access to the main memory 718, 720 is typically controlled by a memory controller (not shown).

The processing system 700 also includes an interface circuit 724. The interface circuit 724 may be implemented by any type of interface standard, such as an Ethernet interface, a universal serial bus (USB), and/or a third generation input/output (3GIO) interface.

One or more input devices 726 are connected to the interface circuit 724. The input device(s) 726 permit a user to enter data and commands into the processing unit 712. The input device(s) can be implemented by, for example, a keyboard, a mouse, a touch screen, a track-pad, a trackball, an isopoint and/or a voice recognition system.

One or more output devices 728 are also connected to the interface circuit 724. The output devices 728 can be implemented, for example, by display devices (e.g., a liquid crystal display, a cathode ray tube display (CRT)), by a printer and/or by speakers. The interface circuit 724, thus, typically includes a graphics driver card.

The interface circuit 724 also includes a communication device such as a modem or network interface card to facilitate exchange of data with external computers via a communications network (such as a cellular or mobile network).

The processing system 700 also includes one or more mass storage devices 730 for storing machine readable instructions and data. Examples of such mass storage devices 730 include floppy disk drives, hard drive disks, compact disk drives and digital versatile disk (DVD) drives. In some examples, the mass storage device 730 may implement the system information (SIB) subsystem/storage 520, and the cell measurement subsystem/storage 530. Additionally or alternatively, in some examples the volatile memory 718 may implement the system information (SIB) subsystem/storage 520, and the cell measurement subsystem/storage 530.

The coded instructions of FIGS. 2 to 5 may be stored in the mass storage device 730, in the volatile memory 718, in the non-volatile memory 720, in the local memory 714 and/or on a removable storage medium, such as a CD or DVD 732.

As an alternative to implementing the methods and/or apparatus described herein in a system such as the processing system of FIG. 6, the methods and or apparatus described herein may be embedded in a structure such as processing unit and/or an ASIC (application specific integrated circuit).

Figure 7A:
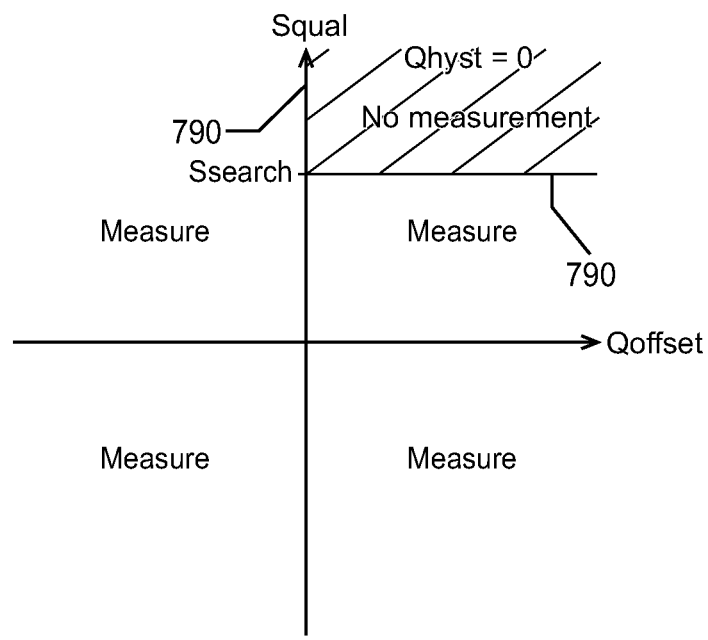
FIGS. 7a to 7g are graphs showing example predefined relationships indicative of when measurements may or may not be performed.
Figure 7B:
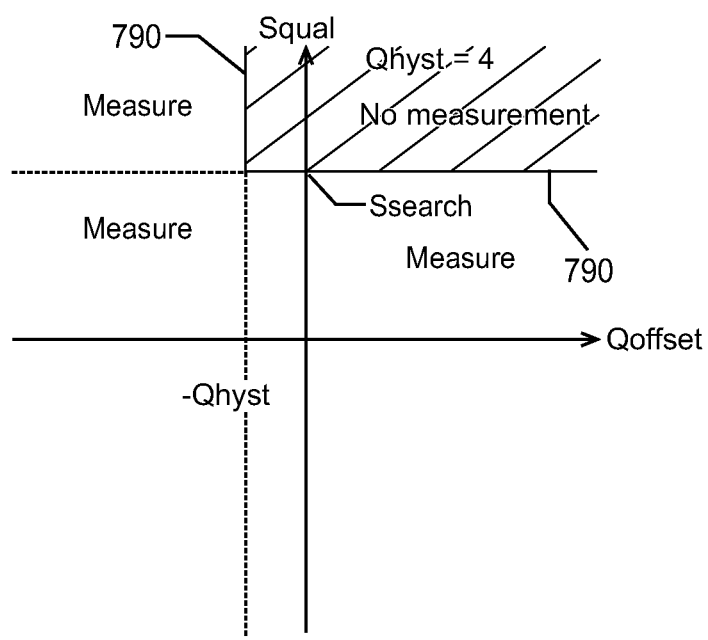
Figure 7C:
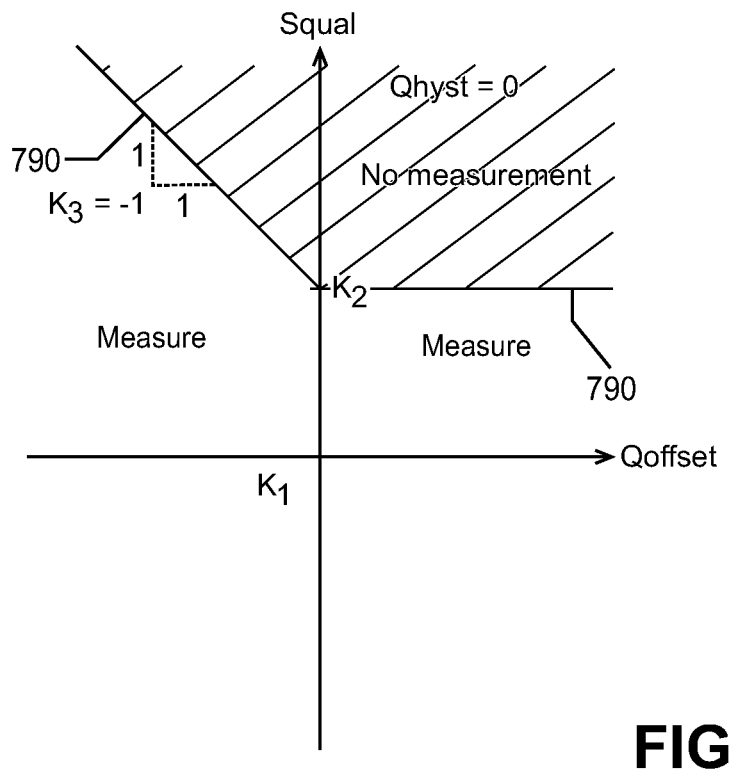
Figure 7D:
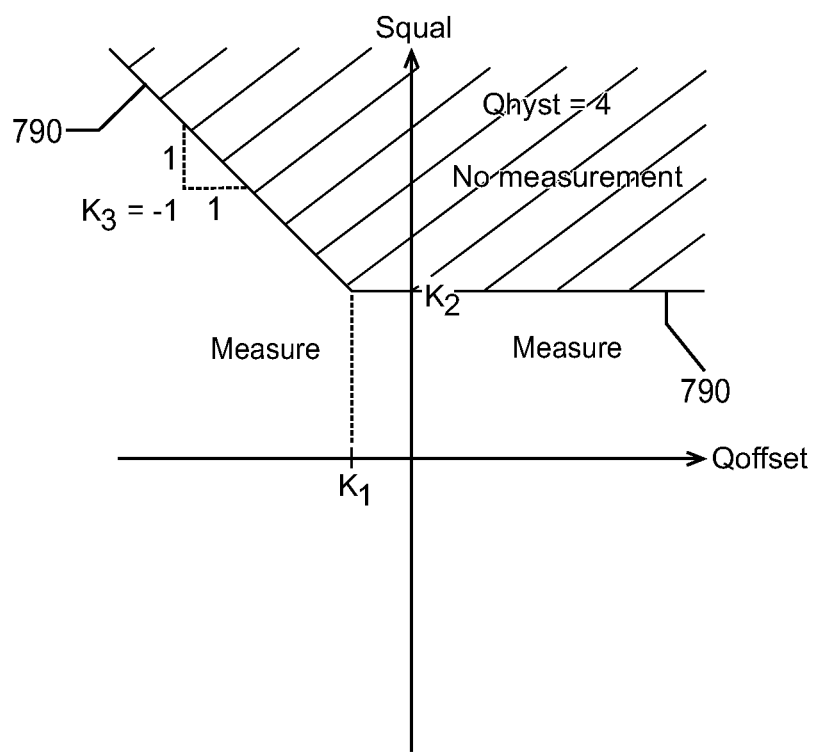
Figure 7E:
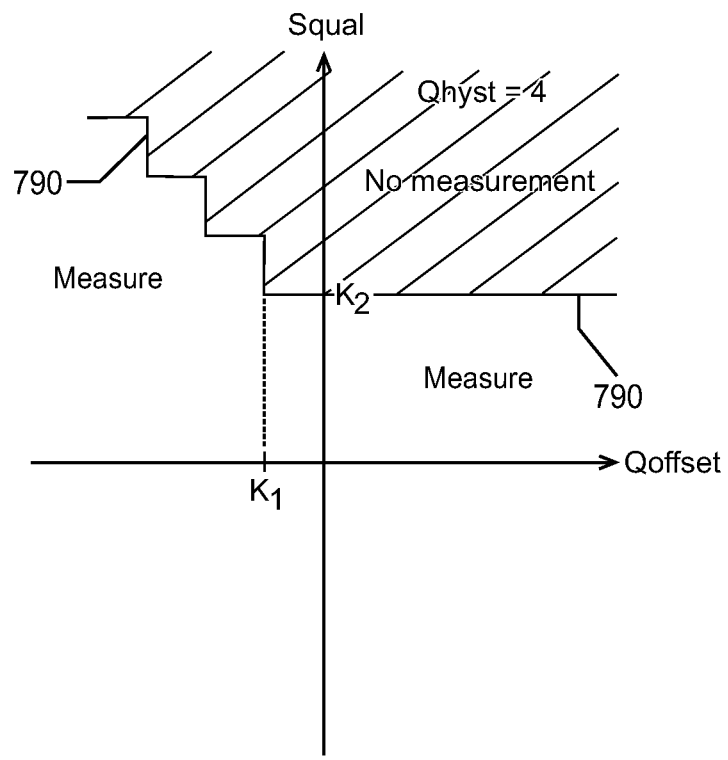
Figure 7F:
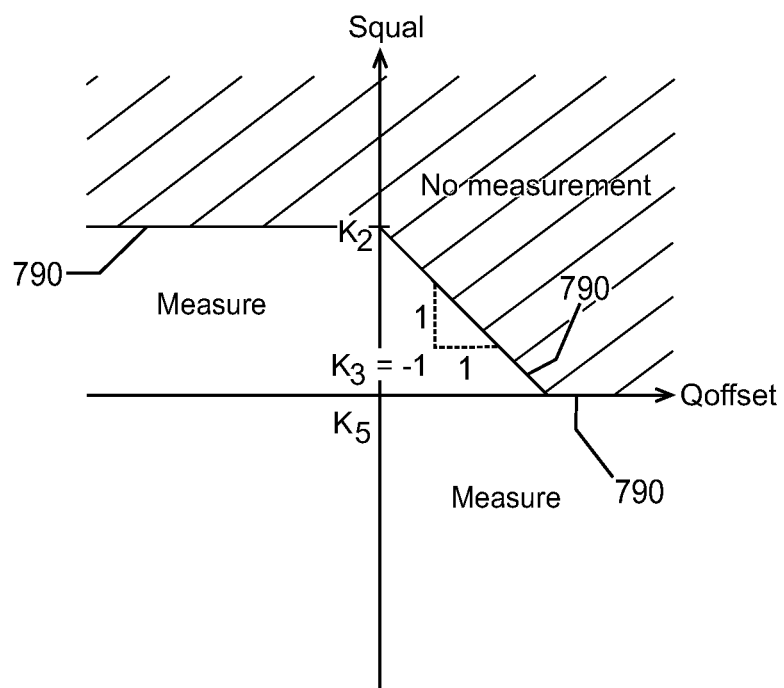
Figure 7G:
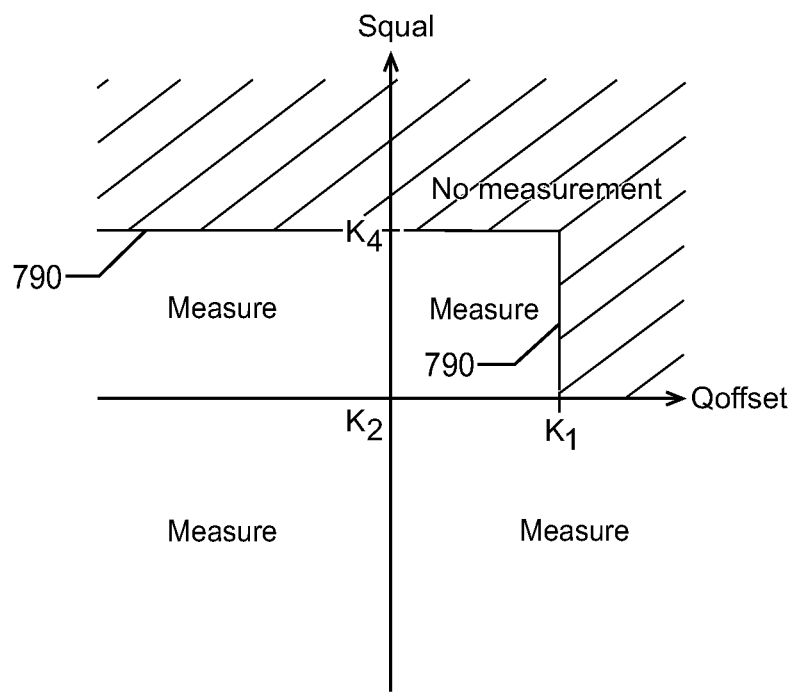

FIGS. 7a to 7g show example predefined relationships between the bias parameter, Qoffset, and selection quality parameter, Squal, indicative of when mobility measurements may or may not be performed. The relationship is defined by the threshold line 790. The cross hatching in each of FIGS. 7a to 7g shows a locus of values, e.g. one side of the threshold line 790, for Qoffset and Squal when a determination may be made not to perform at least one mobility measurement according to the predefined relationships. In other areas not covered by the cross-hatching or on the other side of the threshold line 790, a determination may be made to perform at least one mobility measurement. These relationships may be defined as follows: FIG. 7a No measurements if Squal>Ssearch and Qoffset>0, Perform measurements otherwise;

FIG. 7b No measurements if Squal>Ssearch and Qoffset>-Qhyst,
Perform measurements otherwise;

FIG. 7c For Qoffset>$K_1$: No measurements if Squal>$K_2$,
For Qoffset<=$K_1$: No measurements if Squal>$K_2$-$K_3$×Qoffset,
Where, for example: $K_1$=0, $K_2$=10 dB and $K_3$=-1, and
Perform measurements otherwise;

FIG. 7d As for FIG. 7c, but where, for example: $K_1$=-4 dB, $K_2$=6 dB and $K_3$=-1;

FIG. 7e For Qoffset>$K_1$: No measurements if Squal>$K_2$,
For Qoffset<=$K_1$: No measurements if Squal>Ssearch-f(Qoffset)+$K_3$,
where f(Qoffset) is a predefined function, e.g. Ceil(Qoffset/n) x n, and Ceil(Qoffset/n) is the lowest integer that is not smaller than Qoffset/n, where n can be a predefined integer, for example n can be in the range 1 to 20, 1 to 10, or 1 to 5, or be exactly 1, 2, 3, 4, 5, 6, 7, 8, 9 or 10, and
Perform measurements otherwise;

FIG. 7f For Qoffset>$K_1$: No measurements if Squal>max($K_5$, $K_2$-$K_3$*Qoffset),
For Qoffset<=$K_1$: No measurements if Squal>$K_2$, and
Perform measurements otherwise;

FIG. 7g For Qoffset>$K_1$: No measurements if Squal>$K_2$,
For Qoffset<=$K_1$: No measurements if Squal>$K_4$, and
Perform measurements otherwise.

For these relationships, the values for $K_1$, $K_2$, $K_3$, $K_4$ and/or $K_5$ specified above are examples, and in general:

$K_1$ may equate to or be greater than a fixed value, which may be -Qhyst, or be within a range +/-0%, 1%, 2%, 5%, 10% or 20% of the fixed value. The fixed value may be in a range -20 dB to 0 dB, -10 dB to 0 dB, -6 db to 0 dB, or -5 dB to 0 dB. Alternatively, the fixed value may be -20 dB, -10 dB, -5 dB, -4 dB, -3 dB, -2 dB, -1 dB or 0 dB.

$K_2$ may equate to or be less than a fixed value, which may be Ssearch, or be within a range +/-0%, 1%, 2%, 5%, 10% or 20% of the fixed value. The fixed value may be in a range 0 dB to 20 dB, 0 dB to 10 dB, 0 dB to 6 dB, or 0 dB to 5 dB. Alternatively, the fixed value may be 20 dB, 10 dB, 5 dB, 4 dB, 3 dB, 2 dB, 1 dB or 0 dB.

$K_3$ may equate to or be less than a fixed value, or be within a range +/-0%, 1%, 2%, 5%, 10% or 20% of the fixed value. The fixed value may be in the range 0.1 to 100, 0.5 to 50, 0.7 to 25, 0.8 to 10, 0.9 to 5, 0.95 to 1.5, or 0.99 to 1.1. Alternatively, the fixed value may be 0.5, 1, 2 or 5.

$K_4$ and/or $K_5$ may each equate to or be less than a fixed value which may be within a range +/-0%, 1%, 2%, 5%, 10% or 20% of the fixed value. The fixed value may be in a range -20 dB to 20 dB, -10 dB to 10 dB, -6 dB to 6 dB, or -4 dB to 4 dB. Alternatively, the fixed value may be -20 dB, -10 dB, −5 dB, −4 dB, −3 dB, −2 dB, −1 dB, 0 dB, 1 dB, 2 dB, 3 dB, 4 dB, 5 dB, 10 dB or 20 dB.

The disclosure above represents one or more examples only and it will be appreciated that variations to the specific implementation are possible within the scope of the appended claims.

The invention claimed is:

1. A method in a mobile device for use in a cellular network comprising:
   receiving, via the cellular network, a bias parameter of a neighbour cell; and
   determining whether or not to perform at least one mobility measurement based on whether a selection quality parameter is less than or equal to a cell search threshold (CST) minus a sum of a hysteresis parameter and the bias parameter,
   wherein CST =Qqualmin +Sthreshold, where Qqualmin represents a minimum required quality in cells, and where Sthreshold is one or any of: Sintrasearch, Sintersearch, Snonintrasearch, SsearchRATm and SinterRATsearch.

2. The method of claim 1, further comprising performing the mobility measurement if the determination to perform said at least one mobility measurement is positive.

3. The method of claim 2, wherein the step of performing the mobility measurement comprises performing the mobility measurement in respect of said neighbour cell for which said bias parameter has been received.

4. The method of claim 1 comprising:
   receiving a bias parameter corresponding to each neighbour cell of a plurality of neighbour cells;
   determining for each said bias parameter whether or not to perform at least one mobility measurement in respect of each corresponding neighbour cell; and
   if the determination in respect of a corresponding neighbour cell is positive, performing said at least one mobility measurement in respect of said corresponding neighbour cell.

5. The method of claim 4 further comprising allocating the bias parameter with a predefined value for at least one neighbour cell for which no bias parameter has been received.

6. The method of claim 5, wherein the predefined value is zero.

7. The method of claim 1, wherein the bias parameter is indicative of a bias allocated by the cellular network to select the neighbour cell in a cell reselection procedure.

8. The method of claim 5, wherein the bias parameter is the cell parameter QoffsetXs,n, wherein X is an integer.

9. The method of claim 1 further comprising obtaining the selection quality parameter via the cellular network, wherein the selection quality parameter is the selection quality parameter for a serving cell of the mobile device.

10. The method of claim 1, wherein the hysteresis parameter is QhystXs, wherein X is an integer.

11. The method of claim 1, wherein the mobile device communicates with the cellular network via a serving cell and receives the bias parameter of the neighbour cell via the serving cell.

12. The method of claim 1, wherein the at least one mobility measurement comprises obtaining at least one characteristic of a neighbour cell.

13. The method of claim 12, wherein the at least one characteristic of the neighbour cell is in respect of the neighbour cell corresponding to the received bias parameter.

14. The method of claim 1, wherein the mobile device is in an idle mode and the at least one mobility measurement is an idle mode mobility measurement.

15. The method of claim 1, wherein the mobile device does not receive at least one of the following cell parameters from the cellular network: Sintrasearch, Sintersearch, Snonintrasearch and SinterRATsearch.

16. The method of claim 1 wherein the mobile device does receive at least one of the following cell parameters from the cellular network: Sintrasearch, Sintersearch, Snonintrasearch and SinterRATsearch.

17. The method of claim 16, further comprising determining not to perform a mobility measurement in respect of said neighbour cell when the cell parameters have been received and the bias parameter is less than or equal to a threshold value.

18. A mobile device comprising:
   a receiver for receiving system information block (SIB) messages broadcasted by a radio access network within each serving cell of a cellular network, each of the SIB messages including a bias parameter of a neighbour cell;
   a measurement system for implementing idle mode neighbor cell measurements and cell re-selection operations, coupled to the receiver, the measurement system including:
   a controller for determining whether to perform at least one idle mode mobility measurement by utilizing one or more of: cell quality on the serving cell, the bias parameter, and comparison against a threshold value,
   a reading and storing module for reading the SIB messages and for storing the SIB messages in a memory of the measurement system,
   an evaluating re-selection module for collecting a serving cell power parameter value and/or a serving cell quality parameter value measured at every successful cell re-selection, and
   a cell measurement memory for storing re-selection history data including the collected serving cell power/quality parameters; and
   a processing unit, in communication with the receiver and the measurement system, configured to perform the at least one idle mode mobility measurement if the determination to perform is positive based on whether a selection quality parameter is less than or equal to a cell search threshold (CST) minus a sum of a hysteresis parameter and a bias parameter, wherein CST =Qqualmin +Sthreshold, where Qqualmin represents a minimum required quality in cells, and where Sthreshold is one or any of: Sintrasearch, Sintersearch, Snonintrasearch, SsearchRATm and SinterRATsearch.

19. The mobile device of claim 18, wherein the processing unit is configured to perform the at least one idle mode mobility measurement in respect of said neighbour cell for which said bias parameter has been received.

20. The mobile device of claim 18, wherein the measurement system is configured to compare the bias parameter to a threshold value.

21. The mobile device of claim 20, wherein the measurement system is configured to determine whether the bias parameter summed with a hysteresis parameter is less than or equal to a threshold value, or greater than or equal to the threshold value.

22. The mobile device of claim 18, wherein the receiver receives said at least one cell parameter from a serving cell, and the measurement system is configured to obtain a serving cell quality parameter of the serving cell and determine based on the bias parameter and the serving cell quality parameter whether or not to perform the at least one idle mode mobility measurement.

23. The mobile device of claim 22, wherein the measurement system is configured to compare the bias parameter of the neighbour cell with the serving cell quality parameter.

24. A machine readable non-transitory medium comprising machine-executable instructions for determining whether or not to perform at least one mobility measurement based on whether a selection quality parameter is less than or equal to a cell search threshold (CST) minus a sum of a hysteresis parameter and a bias parameter, wherein CST =Qqualmin +Sthreshold, where Qqualmin represents a minimum required quality in cells, and where Sthreshold is one or any of: Sintrasearch, Sintersearch, Snonintrasearch, SsearchRATm and SinterRATsearch.

\* \* \* \* \*